US012593315B2

(12) United States Patent
Lim et al.

(10) Patent No.: US 12,593,315 B2
(45) Date of Patent: Mar. 31, 2026

(54) METHOD AND DEVICE FOR GENERATING APPDU IN WIRELESS LAN SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 18/257,183

(22) PCT Filed: Dec. 16, 2021

(86) PCT No.: PCT/KR2021/019165
§ 371 (c)(1),
(2) Date: Jun. 13, 2023

(87) PCT Pub. No.: WO2022/131815
PCT Pub. Date: Jun. 23, 2022

(65) Prior Publication Data
US 2024/0040549 A1 Feb. 1, 2024

(30) Foreign Application Priority Data
Dec. 17, 2020 (KR) ........................ 10-2020-0177623

(51) Int. Cl.
*H04W 4/00* (2018.01)
*H04L 5/00* (2006.01)
(Continued)

(52) U.S. Cl.
CPC ........... *H04W 72/04* (2013.01); *H04L 5/0044* (2013.01); *H04L 27/2602* (2013.01); *H04W 84/12* (2013.01)

(58) Field of Classification Search
CPC .... H04W 72/04; H04W 48/12; H04L 5/0044; H04L 27/2602
See application file for complete search history.

(56) References Cited

U.S. PATENT DOCUMENTS

2021/0227529 A1* 7/2021 Chu ...................... H04W 72/23
2023/0224715 A1* 7/2023 Huang .................. H04L 5/0044
370/329

(Continued)

FOREIGN PATENT DOCUMENTS

WO 2020-242109 12/2020

OTHER PUBLICATIONS

PCT International Application No. PCT/KR2021/019165, International Search Report dated Mar. 25, 2022, 3 pages.
(Continued)

*Primary Examiner* — Abdelnabi O Musa
(74) *Attorney, Agent, or Firm* — LEE, HONG, DEGERMAN, KANG & WAIMEY

(57) ABSTRACT

Proposed is a technical feature applied to an aggregated physical protocol data unit (APPDU) comprising various types of sub-PPDUs. Proposed is a technique for negotiating subchannel-related information with a plurality of stations (STAs) in order to determine bandwidths of a plurality of sub-PPDUs included in an APPDU. The APPDU is generated on the basis of a negotiated subchannel, and a signal field, including bandwidth-related information, may be configured for each of the plurality of sub-PPDUs included in the APPDU. The APPDU may be transmitted to a receiving STA through a subchannel selective transmission (SST) operation.

9 Claims, 19 Drawing Sheets

(a)

(b)

(51) Int. Cl.
    *H04L 27/26*         (2006.01)
    *H04W 72/04*       (2023.01)
    *H04W 84/12*       (2009.01)

(56)       References Cited

U.S. PATENT DOCUMENTS

| | | | | |
|---|---|---|---|---|
| 2023/0231752 | A1* | 7/2023 | Liu | H04W 80/00 |
| | | | | 375/262 |
| 2023/0276415 | A1* | 8/2023 | Ko | H04W 74/06 |
| | | | | 370/329 |
| 2023/0309087 | A1* | 9/2023 | Huang | H04W 72/0457 |
| 2023/0319629 | A1* | 10/2023 | Ko | H04L 1/0007 |
| | | | | 370/230 |
| 2024/0039773 | A1* | 2/2024 | Lim | H04L 27/2602 |
| 2024/0121669 | A1* | 4/2024 | Park | H04L 5/0053 |
| 2024/0129082 | A1* | 4/2024 | Park | H04L 5/00 |
| 2024/0430745 | A1* | 12/2024 | Yu | H04W 28/065 |

OTHER PUBLICATIONS

Vermani et al., "Proposed Draft Text (PDT-PHY): An update to Preamble: U-SIG," IEEE 802.11-20/1875r0, Nov. 2020, 15 pages.

Cao et al., "Aggregated PPDU for Large BW," IEEE 802.11-20/0693r0, May 2020, 9 pages.

Lim et al., "Signaling for various transmission modes of MU-PPDU," IEEE 802.11-20/1515r3, Oct. 2020, 17 pages.

Vermani et al., "PPDU Types and U-SIG Content," IEEE 802.11-20/0049r2, Jan. 2020, 26 pages.

* cited by examiner (a)

Figure 3:
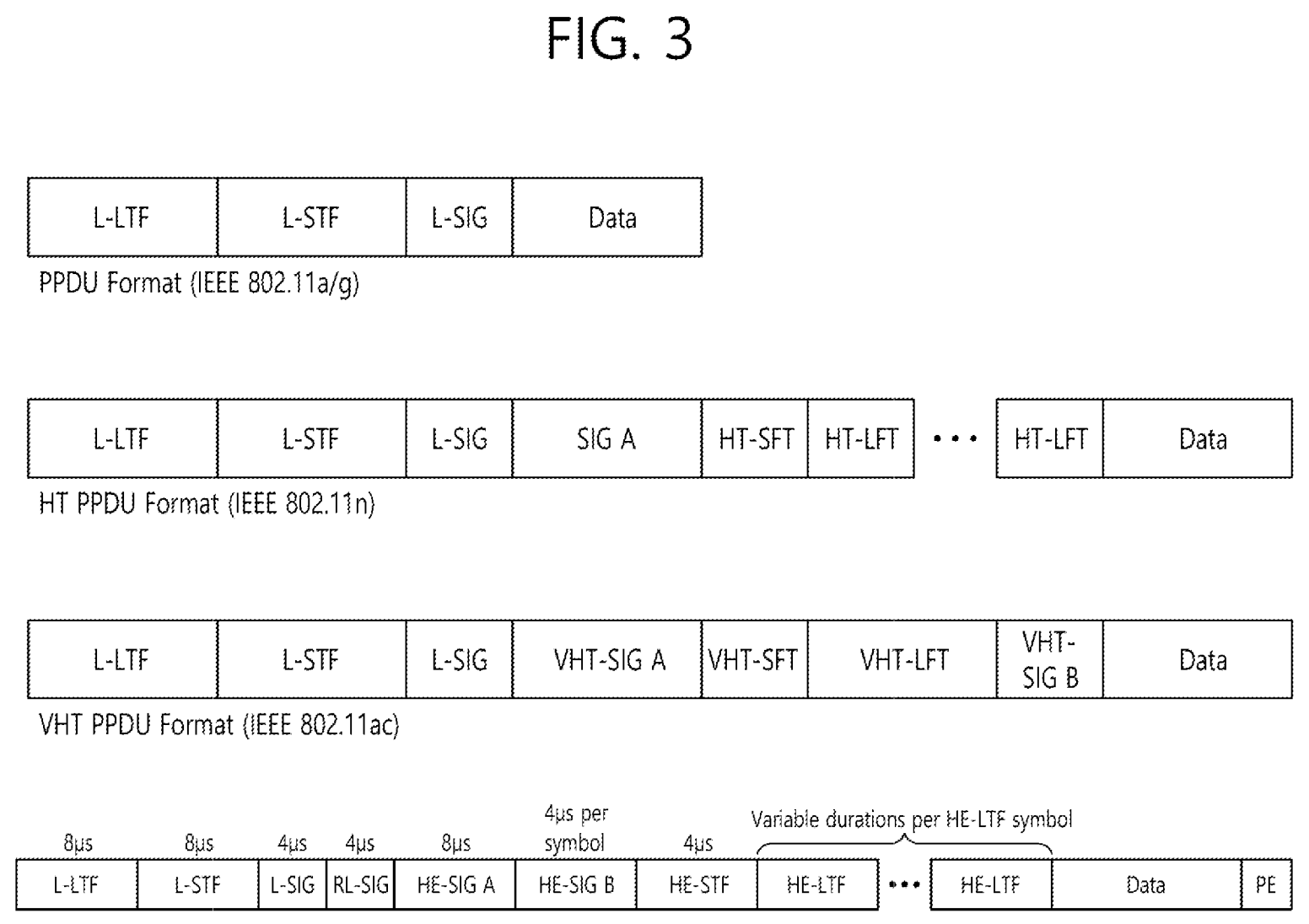

| L-LTF | L-STF | L-SIG | Data |
|-------|-------|-------|------|

PPDU Format (IEEE 802.11a/g)

| L-LTF | L-STF | L-SIG | SIG A | HT-SFT | HT-LFT | ... | HT-LFT | Data |
|-------|-------|-------|-------|--------|--------|-----|--------|------|

HT PPDU Format (IEEE 802.11n)

| L-LTF | L-STF | L-SIG | VHT-SIG A | VHT-SFT | VHT-LFT | VHT-SIG B | Data |
|-------|-------|-------|-----------|---------|---------|-----------|------|

VHT PPDU Format (IEEE 802.11ac)

| 8μs | 8μs | 4μs | 4μs | 8μs | 4μs per symbol | 4μs | | Variable durations per HE-LTF symbol | | | |
|-----|-----|-----|-----|-----|----------------|-----|---|--------------------------------------|---|---|---|
| L-LTF | L-STF | L-SIG | RL-SIG | HE-SIG A | HE-SIG B | HE-STF | HE-LTF | ... | HE-LTF | Data | PE |

FIG. 13

| L-LTF | L-STF | L-SIG | RL-SIG | U-SIG | EHT-SIG | EHT-STF | EHT-LTF | Data |
|-------|-------|-------|--------|-------|---------|---------|---------|------|

8μs    8μs    4μs    4μs    4μs

1600

1700

| Version independent field (1710) | Version dependent field (1720) |
| --- | --- |

METHOD AND DEVICE FOR GENERATING APPDU IN WIRELESS LAN SYSTEM

CROSS-REFERENCE TO RELATED APPLICATIONS

This application is the National Stage filing under 35 U.S.C. 371 of International Application No. PCT/KR2021/019165, filed on Dec. 16, 2021, which claims the benefit of earlier filing date and right of priority to Korean Application No. 10-2020-0177623, filed on Dec. 17, 2020, the contents of which are all hereby incorporated by reference herein in their entireties.

TECHNICAL FIELD

The present disclosure relates to a wireless LAN system, and more specifically, to a method and apparatus for generating APPDUs that include different types of PPDUs.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHz) may be used for high throughput. Also, in order to efficiently use the bandwidth, preamble puncturing and multiple RU transmission may be used.

SUMMARY

In conventional WLAN systems, a single type of PPDU (Physical Protocol Data Unit) is created. However, the EHT specification discusses an Aggregated PPDU (APPDU) that contains different types of PPDUs. For example, a traditional high efficiency (HE) PPDU and a new extremely high throughput (EHT) PPDU can be included in one APPDU.

New APPDUs may include a variety of technical features. This specification proposes various technical features applicable to APPDUs. For example, this specification may propose different technical features for allocating bands/channels/subchannels for different types of STAs (e.g., HE STAs, EHT STAs, etc.) associated with an APPDU. For example, this specification may propose different technical features governing the control fields of different types of sub-PPDUs included in an APPDU.

For example, the specification may propose preferred examples of bands/channels/subchannels that are allocated to a particular type of STA. For example, the specification may propose a preferred bandwidth for APPDUs. For example, the specification may propose preferred bandwidths for various sub-PPDUs.

The technical features of the present disclosure can be applied to a variety of methods and apparatus. For example, one aspect of the disclosure may relate to a method for use in a Wireless Local Area Network (WLAN) system. For example, the method may include transmitting assignment information regarding channels to which a first type station (STA) supporting a first type physical protocol data unit (PPDU) is assigned and channels to which a second type STA supporting a second type PPDU is assigned. For example, the method may include the step of generating an aggregated PPDU (APPDU) comprising a first sub-PPDU constructed based on the first type PPDU and a second sub-PPDU constructed based on the second type PPDU. For example, the APPDU may be configured over a 320 MHz channel, wherein the 320 MHz channel may include a primary 160 MHz channel and a secondary 160 MHz channel. For example, the first sub-PPDU may be configured on the primary 160 MHz channel, and the second sub-PPDU may be configured on the secondary 160 MHz channel. For example, the PHY preamble of the first sub-PPDU may include a first signal field, and the first signal field may include a first field value related to a bandwidth of the primary 160 MHz channel. For example, the PHY preamble of the second sub-PPDU may include a second signal field, and the second signal field may include a second field value related to a bandwidth of the 320 MHz channel.

The present disclosure proposes techniques for efficiently allocating bands/channels/subchannels for different types of STAs (e.g., HE STA, EHT STA, etc.) related to the APPDU. The present disclosure also proposes techniques for generating/transmitting/receiving APPDU(s) on the allocated bands/channels/subchannel(s). This enables the present disclosure to efficiently allocate bands/channels/subchannels to multiple STAs attempting to decode an APPDU. The present disclosure may also propose an example of efficiently directing the bandwidth of an APPDU to multiple STAs attempting to decode the APPDU. The present disclosure may also propose an example of efficiently instructing an OBSS STA that receives an APPDU to provide accurate information about the APPDU.

BRIEF DESCRIPTION OF THE DRAWINGS

FIG. 3 illustrates an example of a PPDU used in an IEEE standard.

FIG. 13 illustrates an example of a PPDU used in the present specification.

DETAILED DESCRIPTION

Figure 1:
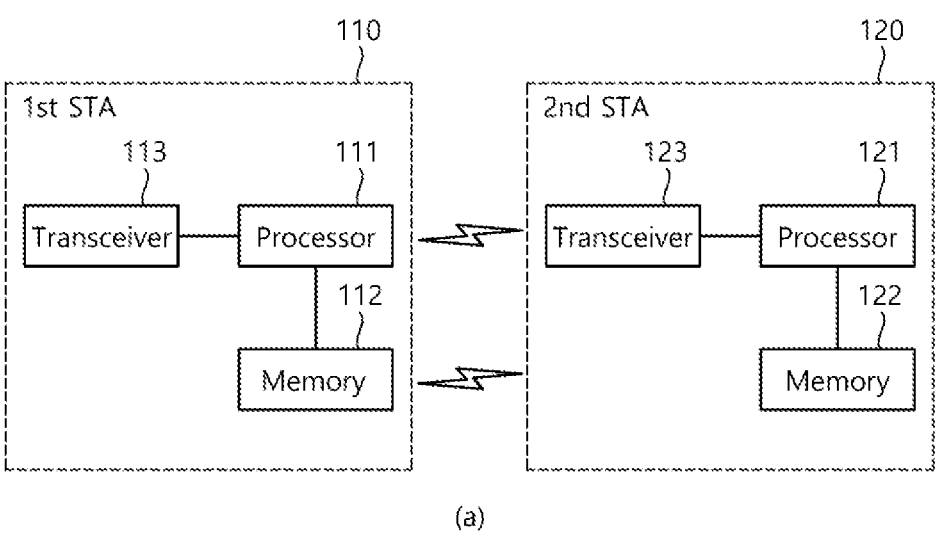
FIG. 1 shows an example of a transmitting apparatus and/or receiving apparatus of the present specification.
Figure 1:
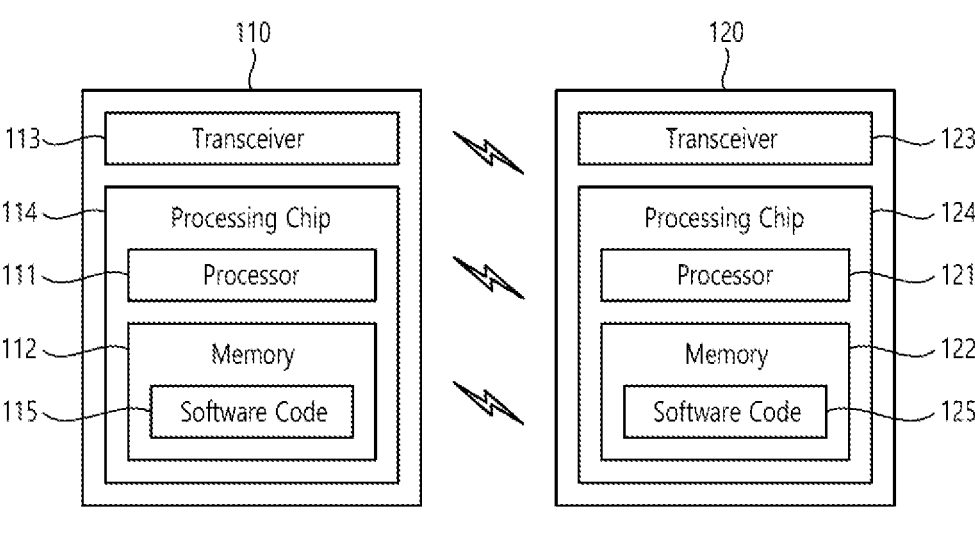

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11 a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
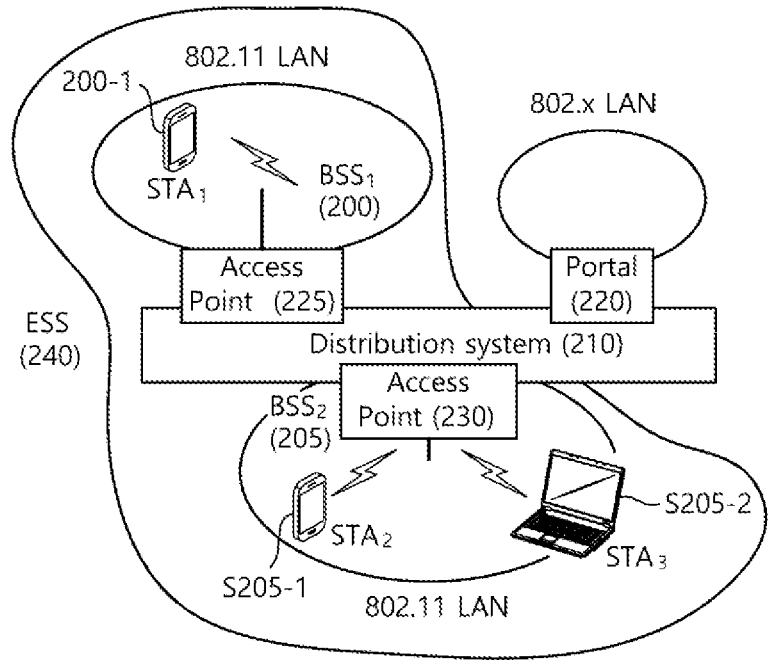
FIG. 2 is a conceptual view illustrating the structure of a wireless local area network (WLAN).
Figure 2:
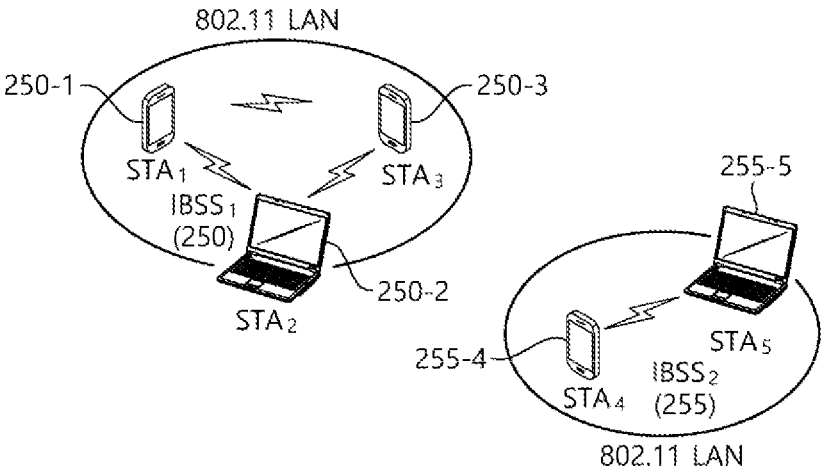

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates an example of a PPDU used in an IEEE standard.

As illustrated in FIG. 3, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
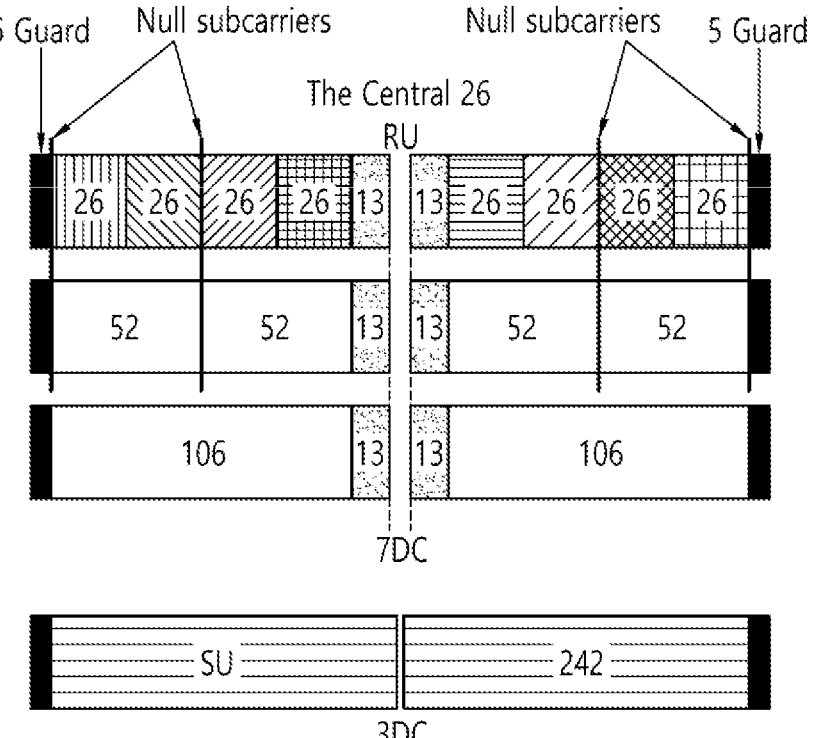
FIG. 4 illustrates a layout of resource units (RUs) used in a band of 20 MHz.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
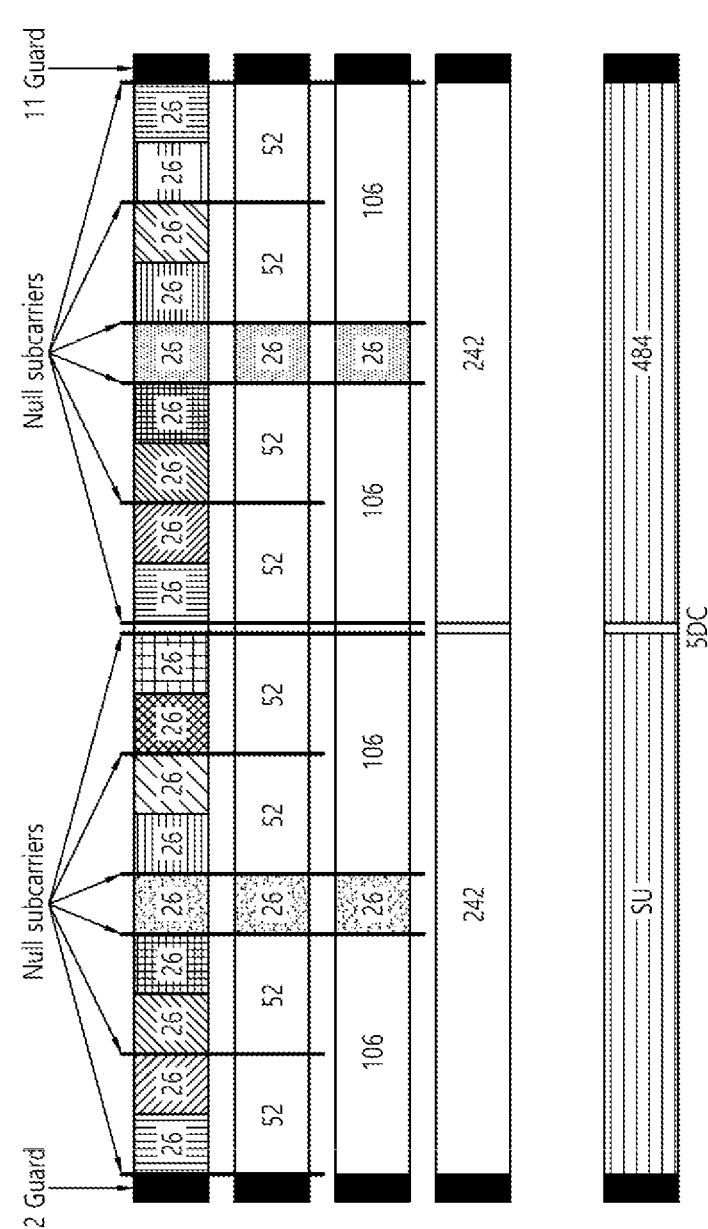
FIG. 5 illustrates a layout of RUs used in a band of 40 MHz.

FIG. 5 illustrates a layout of RUs used in a band of 40 MHz.

Similar to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similar to FIG. 5.

Figure 6:
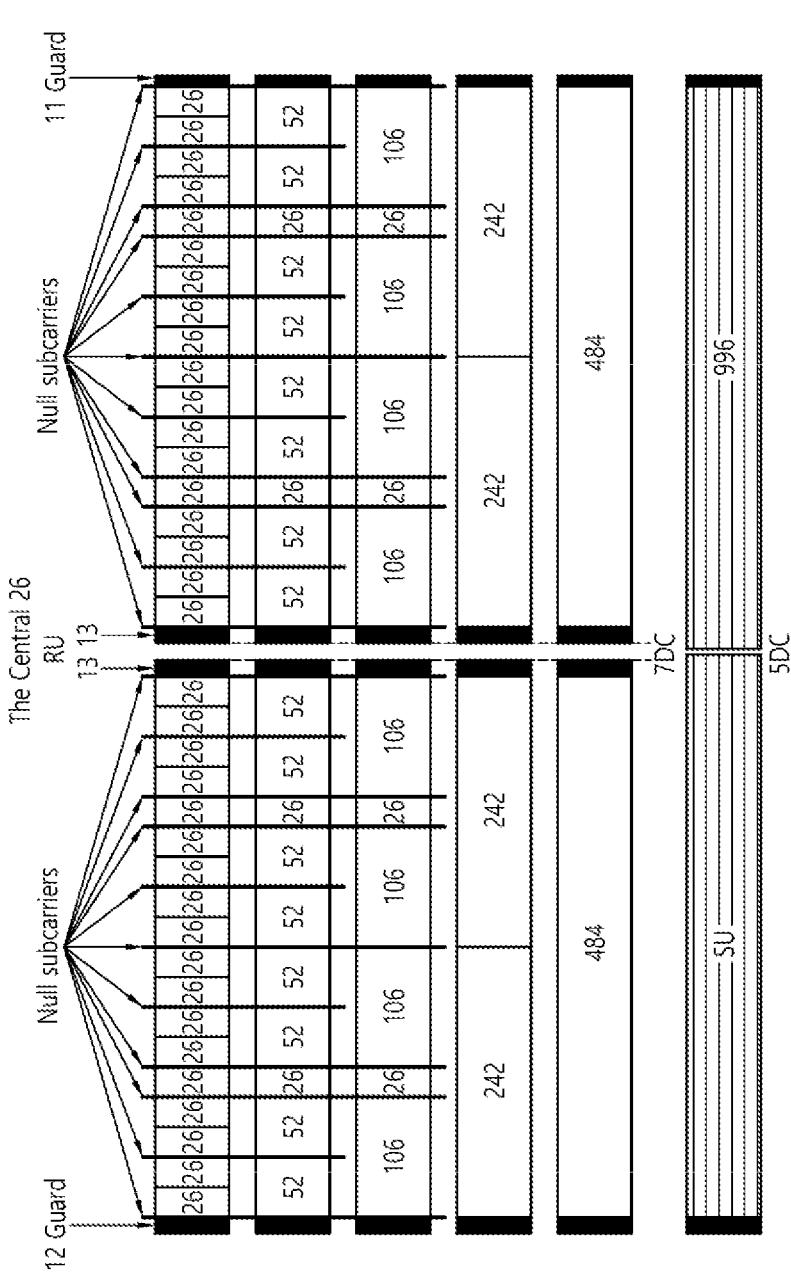
FIG. 6 illustrates a layout of RUs used in a band of 80 MHz.

FIG. 6 illustrates a layout of RUs used in a band of 80 MHz.

Similar to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

10

Information related to a layout of the RU may be signaled through HE-SIG-B.

Figure 7:
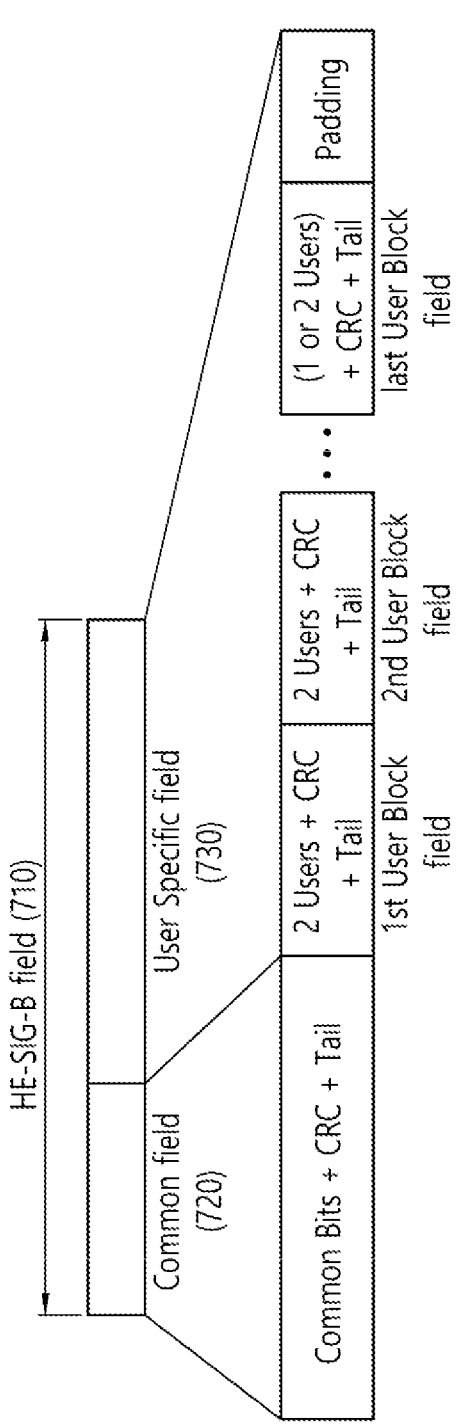
FIG. 7 illustrates a structure of an HE-SIG-B field.

FIG. 7 illustrates a structure of an HE-SIG-B field.

As illustrated, an HE-SIG-B field 710 includes a common field 720 and a user-specific field 730. The common field 720 may include information commonly applied to all users (i.e., user STAs) which receive SIG-B. The user-specific field 730 may be called a user-specific control field. When the SIG-B is transferred to a plurality of users, the user-specific field 730 may be applied only any one of the plurality of users.

As illustrated, the common field 720 and the user-specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 |  | 26 | 26 | 1 |
| 00000011 | 26 | 26 | 26 | 26 | 26 | 52 |  | 52 |  | 1 |
| 00000100 | 26 | 26 | 52 |  | 26 | 26 | 26 | 26 | 26 | 1 |
| 00000101 | 26 | 26 | 52 |  | 26 | 26 | 26 | 52 |  | 1 |
| 00000110 | 26 | 26 | 52 |  | 26 | 52 |  | 26 | 26 | 1 |
| 00000111 | 26 | 26 | 52 |  | 26 | 52 |  | 52 |  | 1 |
| 00001000 | 52 |  | 26 | 26 | 26 | 26 | 26 | 26 | 26 | 1 |

As shown the example of FIG. 4, up to nine 26-RUs may be allocated to the 20 MHz channel. When the RU allocation information of the common field 720 is set to "00000000" as shown in Table 1, the nine 26-RUs may be allocated to a corresponding channel (i.e., 20 MHz). In addition, when the RU allocation information of the common field 720 is set to "00000001" as shown in Table 1, seven 26-RUs and one 52-RU are arranged in a corresponding channel. That is, in the example of FIG. 4, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ |  | 106 |  |  | 26 | 26 | 26 | 26 | 26 | 8 |
| $01001y_2y_1y_0$ |  | 106 |  |  | 26 | 26 | 26 | 52 |  | 8 |
| z | z | z | z | z | z | z | z | z | z | z |

"$01000y_2y_1y_0$" relates to an example in which a 106-RU is allocated to the leftmost side of the 20 MHz channel, and five 26-RUs are allocated to the right side thereof. In this case, a plurality of STAs (e.g. user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user-specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

For example, when RU allocation is set to "01000010" as shown in FIG. 7, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 730 of HE-SIG-B may include eight user fields.

Figure 9:
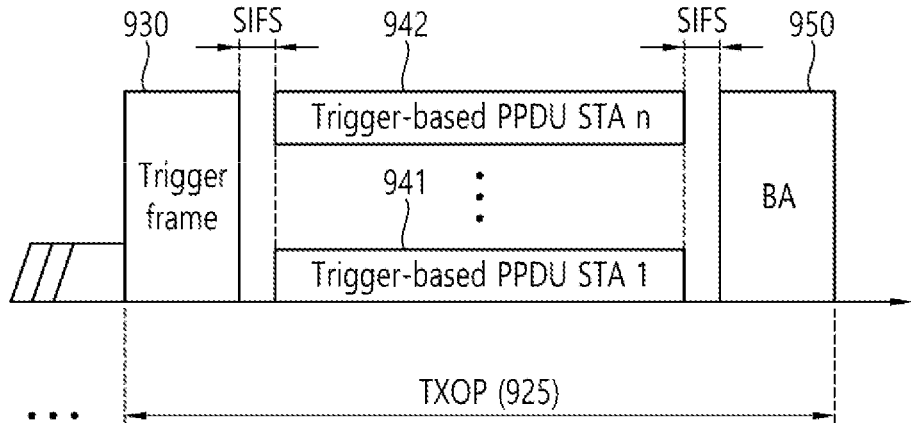
FIG. 9 illustrates an operation based on UL-MU.

The eight user fields may be expressed in the order shown in FIG. 9. In addition, as shown in FIG. 7, two user fields may be implemented with one user block field.

Figure 8:
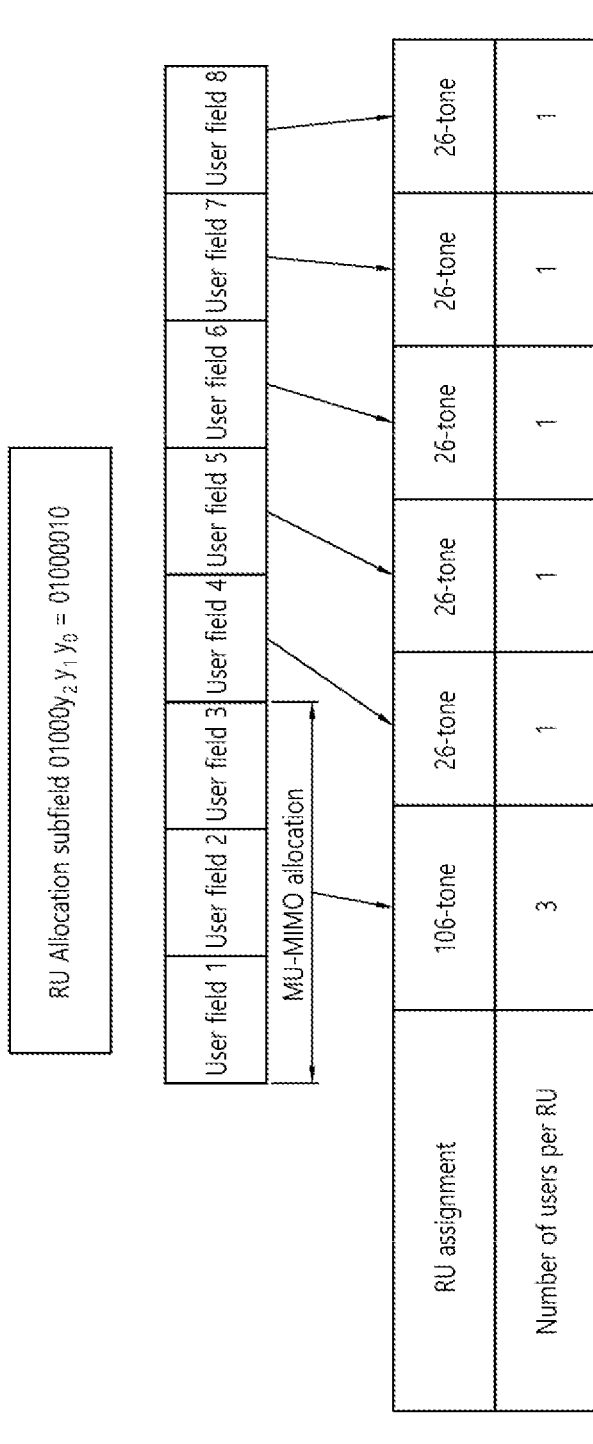
FIG. 8 illustrates an example in which a plurality of user STAs are allocated to the same RU through a MU-MIMO scheme.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | z | | | 4-7 | 11 |
| | 0100-0110 | 2-4 | 2 | 1 | 1 | | z | | | 6-8 | |
| | 0111 | 3 | 3 | 1 | 1 | | z | | | 8 | |
| | 1000-1001 | 2-3 | 2 | 2 | 1 | | z | | | 7-8 | |
| | 1010 | 2 | 2 | 2 | 2 | | z | | | 8 | |

50

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-6 | 7 |
| | 0100-0101 | 2-3 | 2 | 1 | 1 | 1 | | | | 7-8 | |
| | 0110 | 3 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 8 illustrates an example in which a plurality of user STAs are allocated to the same RU through a MU-MIMO scheme.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 8, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

FIG. 9 illustrates an operation based on UL-MU. As illustrated, a transmitting STA (e.g., AP) may perform channel access through contending (e.g., a backoff operation), and may transmit a trigger frame 930. That is, the transmitting STA may transmit a PPDU including the trigger frame

930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
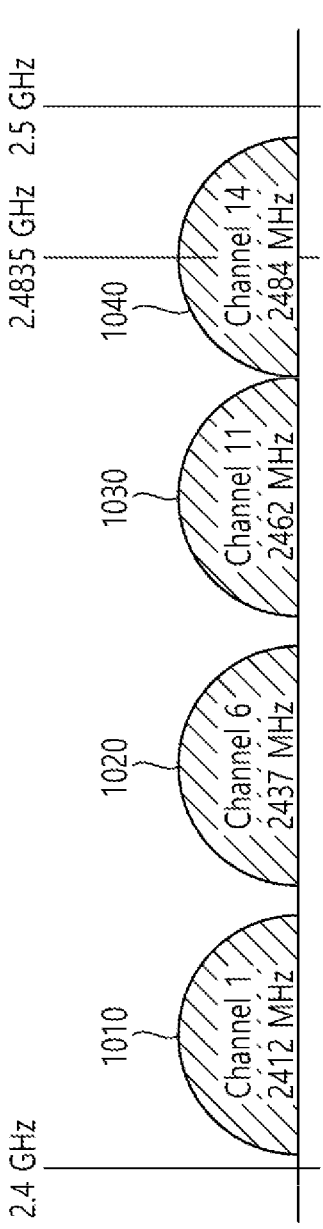
FIG. 10 illustrates an example of a channel used/supported/defined within a 2.4 GHz band.

FIG. 10 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHz.

Figure 11:
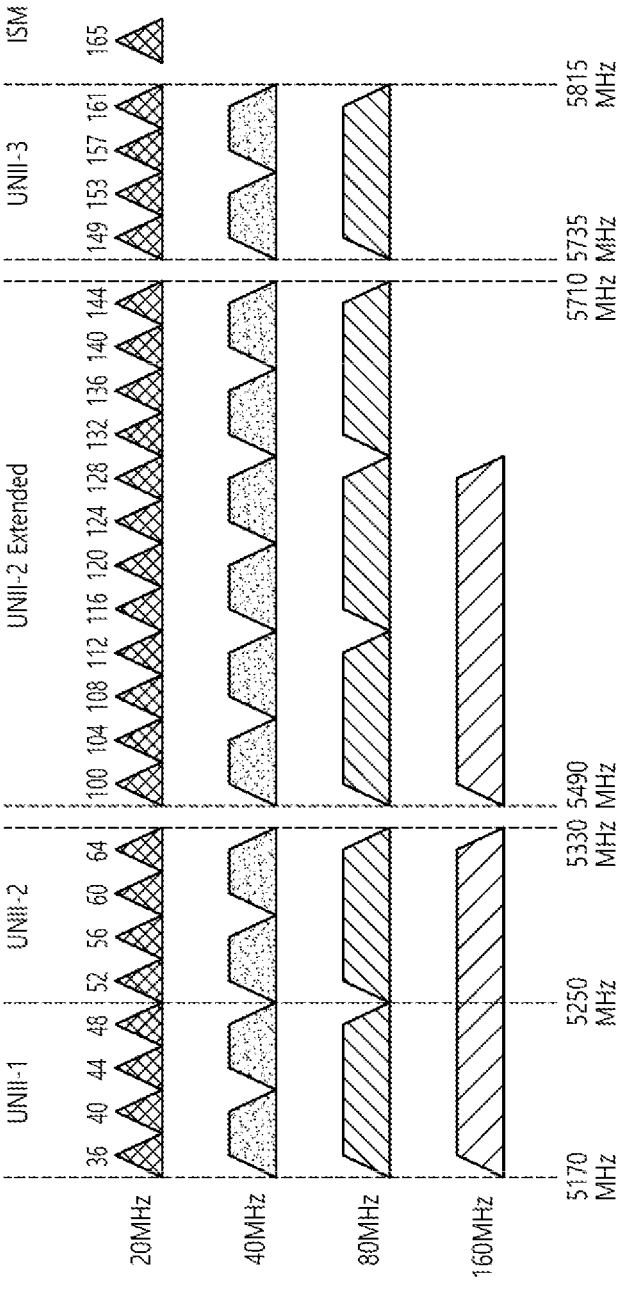
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 12:
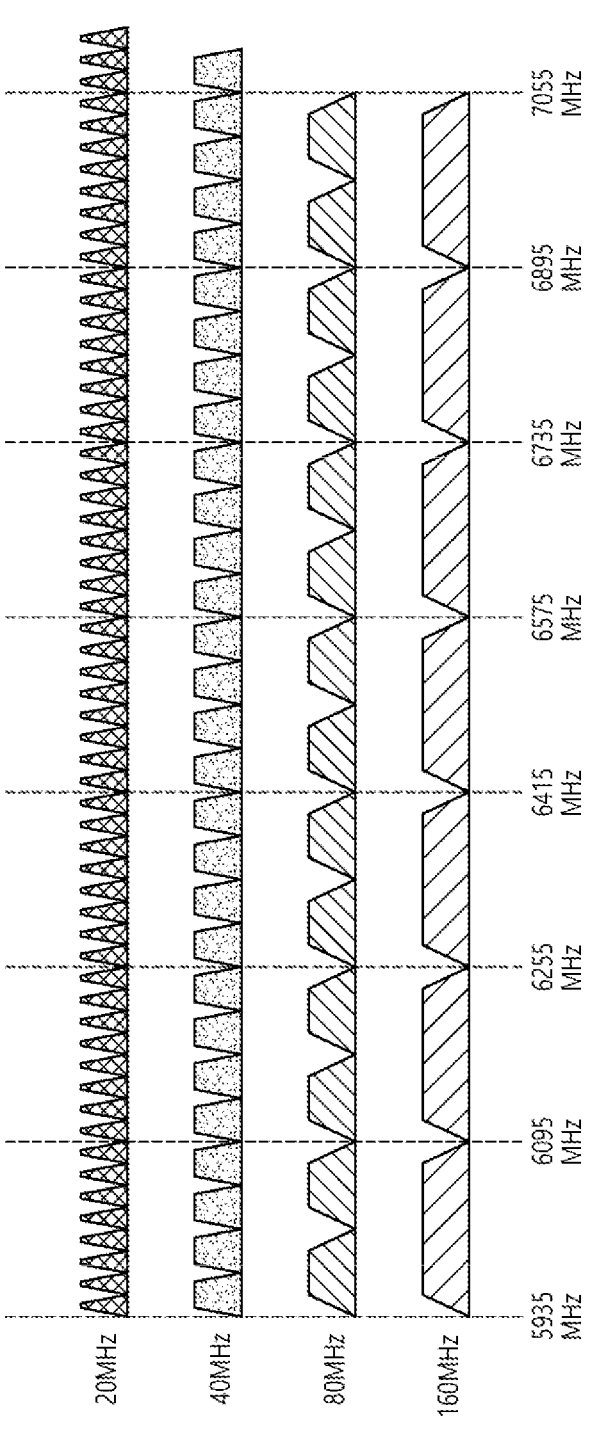
FIG. 12 illustrates an example of a channel used/supported/defined within a 6 GHz band.

FIG. 12 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 13 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 12, a 240 MHz channel or a 320 MHz channel may be additionally added.

Hereinafter, a PPDU transmitted/received in an STA of the present specification will be described.

Figure 13:
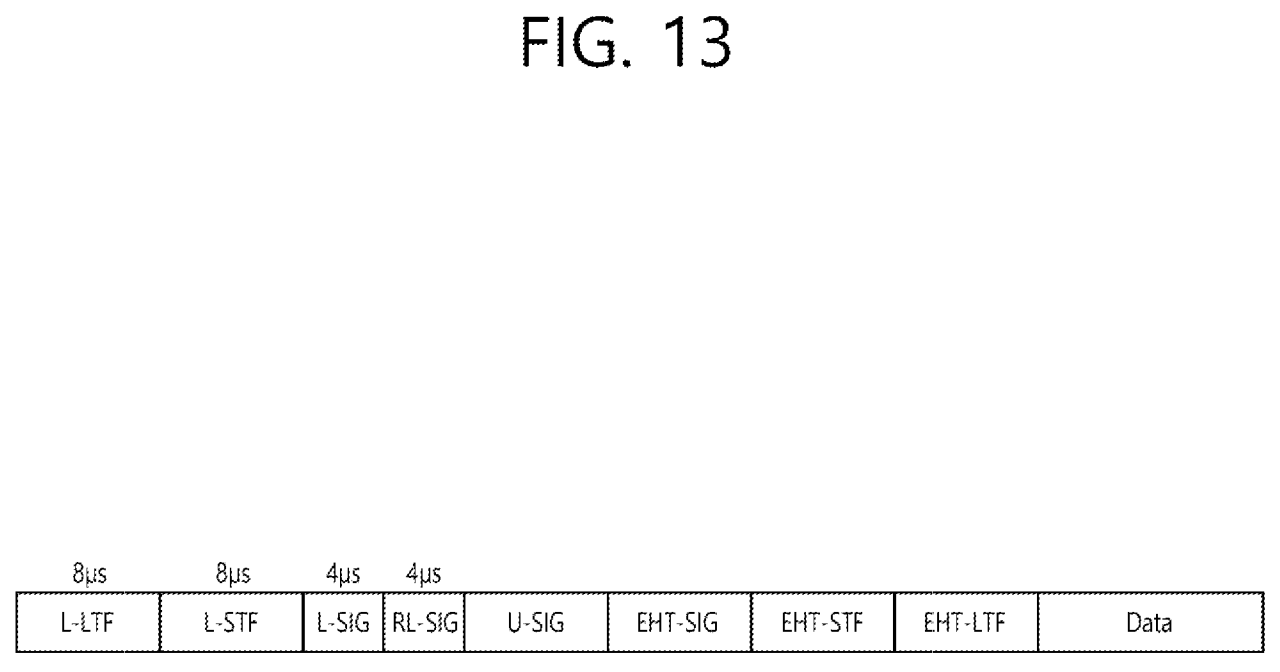

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 14:
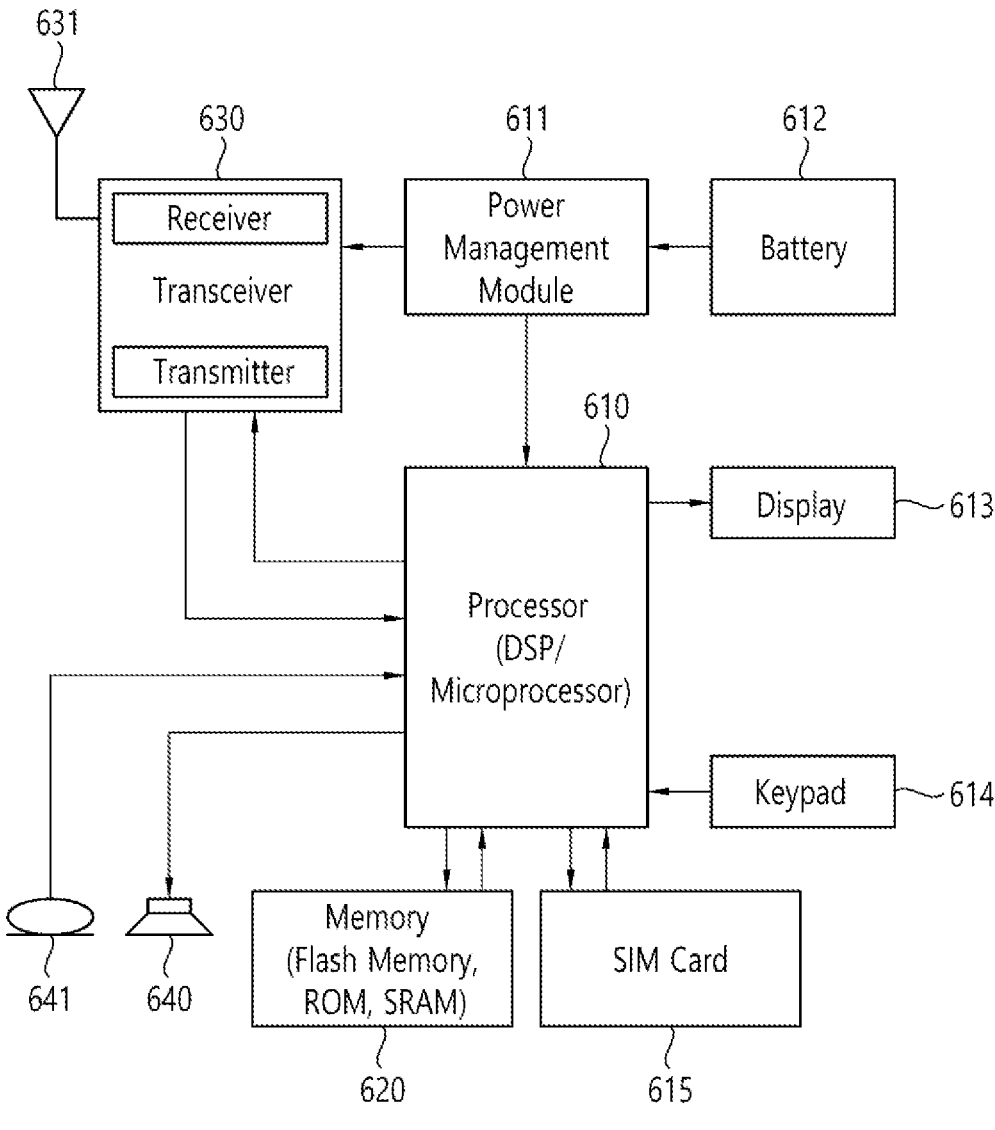
FIG. 14 illustrates an example of a modified transmission device and/or receiving device of the present specification.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 14 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation in the frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 13. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user-specific field as in the example of FIG. 7. The common field of the EHT-SIG may be omitted, and the number of user-specific fields may be determined based on the number of users.

As in the example of FIG. 7, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 8, each user field may be related to MU-MIMO allocation, or may be related to non-MU-MIMO allocation.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | 52 | | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | 106 | | | | 26 | 26 | 26 | 26 | 26 | 1 |
| 21 | 106 | | | | 26 | 26 | 26 | 52 | | 1 |
| 22 | 106 | | | | 26 | 52 | | 26 | 26 | 1 |
| 23 | 106 | | | | 26 | 52 | | 52 | | 1 |
| 24 | 52 | | 52 | | — | 52 | | 52 | | 1 |
| 25 | | 242-tone RU empty (with zero users) | | | | | | | | 1 |
| 26 | 106 | | | | 26 | 106 | | | | 1 |
| 27-34 | | | | 242 | | | | | | 8 |
| 35-42 | | | | 484 | | | | | | 8 |
| 43-50 | | | | 996 | | | | | | 8 |
| 51-58 | | | | 2*996 | | | | | | 8 |
| 59 | 26 | 26 | 26 | 26 | 26 | 52 + 26 | | | 26 | 1 |
| 60 | 26 | 26 + 52 | | | 26 | 26 | 26 | 26 | 26 | 1 |
| 61 | 26 | 26 + 52 | | | 26 | 26 | 26 | 52 | | 1 |
| 62 | 26 | 26 + 52 | | | 26 | 52 | | 26 | 26 | 1 |
| 63 | 26 | 26 | 52 | | 26 | 52 + 26 | | | 26 | 1 |
| 64 | 26 | 26 + 52 | | | 26 | 52 + 26 | | | 26 | 1 |
| 65 | 26 | 26 + 52 | | | 26 | 52 | | 52 | | 1 |

TABLE 7

| Indices | #1 | #2 | #3 | #4 | #5 | #6 | #7 | #8 | #9 | Number of entries |
|---|---|---|---|---|---|---|---|---|---|---|
| 66 | 52 | | 26 | 26 | 26 | 52 + 26 | | | 26 | 1 |
| 67 | 52 | | 52 | | 26 | 52 + 26 | | | 26 | 1 |
| 68 | 52 | | 52 + 26 | | | 52 | | 52 | | 1 |
| 69 | 26 | 26 | 26 | 26 | 26 + 106 | | | | | 1 |
| 70 | 26 | 26 + 52 | | | 26 | 106 | | | | 1 |
| 71 | 26 | 26 | 52 | | 26 + 106 | | | | | 1 |
| 72 | 26 | 26 + 52 | | | 26 + 106 | | | | | 1 |
| 73 | 52 | | 26 | 26 | 26 + 106 | | | | | 1 |
| 74 | 52 | | 52 | | 26 + 106 | | | | | 1 |
| 75 | 106 + 26 | | | | | 26 | 26 | 26 | 26 | 1 |
| 76 | 106 + 26 | | | | | 26 | 26 | 52 | | 1 |
| 77 | 106 + 26 | | | | | 52 | | 26 | 26 | 1 |
| 78 | 106 | | | | 26 | 52 + 26 | | | 26 | 1 |
| 79 | 106 + 26 | | | | | 52 + 26 | | | 26 | 1 |
| 80 | 106 + 26 | | | | | 52 | | 52 | | 1 |
| 81 | 106 + 26 | | | | | 106 | | | | 1 |
| 82 | 106 | | | | 26 + 106 | | | | | 1 |

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 4 and FIG. 5.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

FIG. 14 illustrates an example of a modified transmission device and/or receiving device of the present specification.

Figure 15:
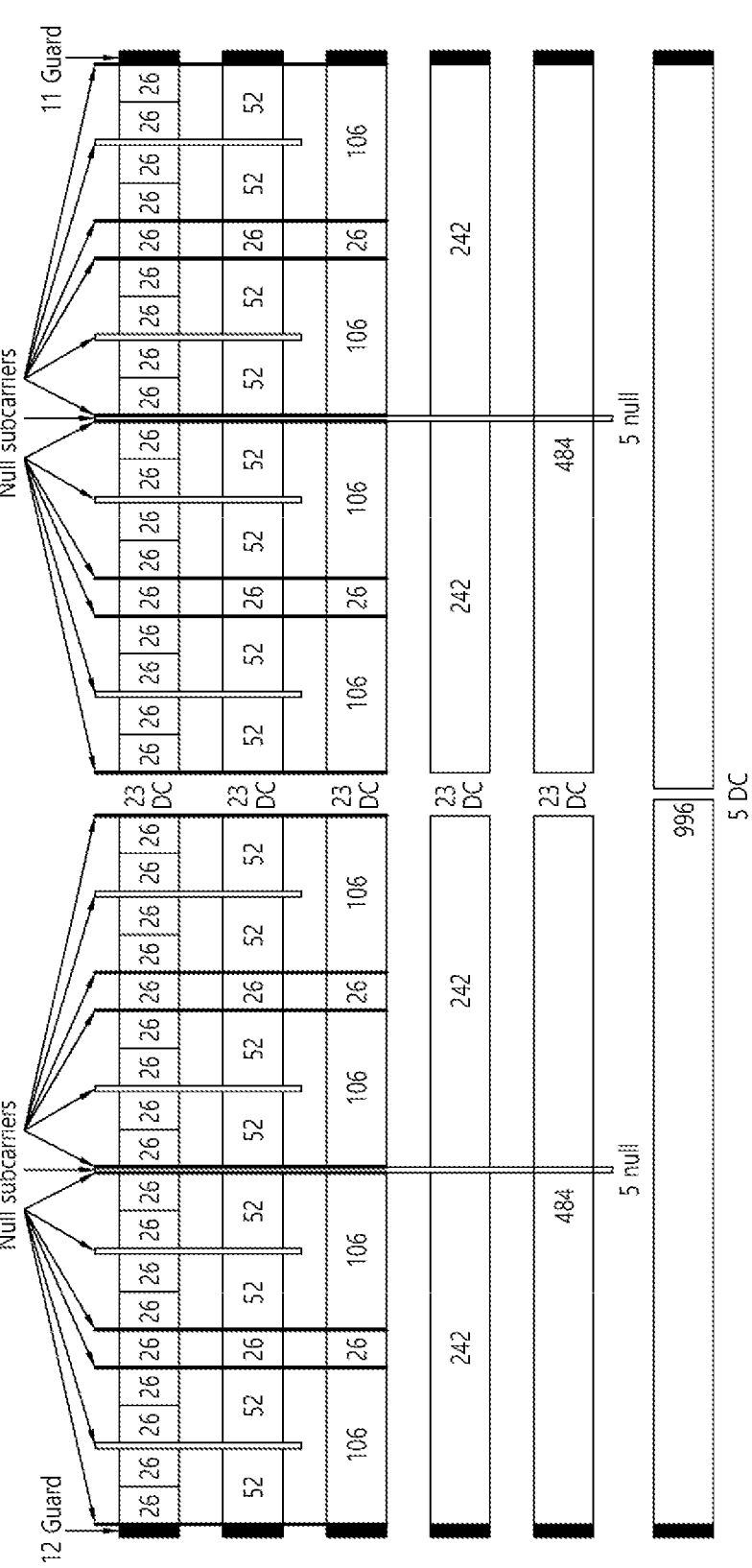
FIG. 15 is a diagram illustrating the placement of resource units (RUs) used in the 80 MHz band.

Each device/STA of the sub-figure (a)/(b) of FIG. 1 may be modified as shown in FIG. 15. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

FIG. 15 is a diagram illustrating an arrangement of resource units (RUs) used in the 80 MHz band. The arrangement of resource units (RUs) used herein may vary. For example, the arrangement of the resource units (RUs) used in the 80 MHz band can be varied. For example, the arrangement of resource units (RUs) used in the 80 MHz band may be configured based on FIG. 15 rather than FIG. 6.

Configuration of the EHT PPDU

To support transmission methods based on the EHT specification, a new frame format may be utilized. When the new frame format is used to transmit signals in the 2.4/5/6 GHz band, convention Wi-Fi receivers (or STAs) (e.g., receivers based on the 802.11n/ac/ax standard), as well as receivers that support the EHT standard, may receive EHT signals transmitted in the 2.4/5/6 GHz band.

The preamble of a PPDU based on the EHT specification may be configured in various ways. In the following, an embodiment in which the preamble of a PPDU based on the EHT specification is configured may be described. In the following, a PPDU based on the EHT specification may be described as an EHT PPDU. However, an EHT PPDU is not limited to the EHT specification. EHT PPDUs may include PPDUs based on the 802.11be specification (i.e., the EHT specification) as well as PPDUs based on new specifications that advance, evolve, or extend the 802.11be specification.

Figure 16:
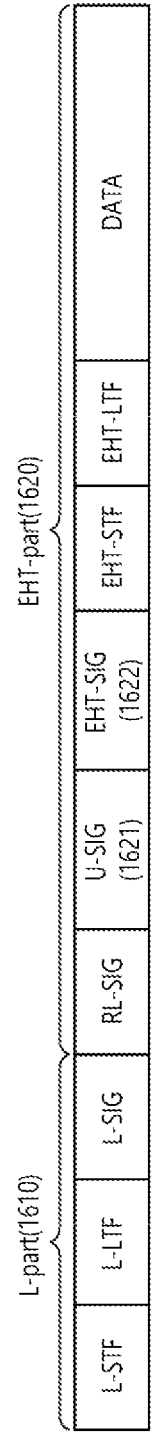
FIG. 16 illustrates an example of an EHT PPDU.

FIG. 16 shows an example of an EHT PPDU.

Referring to FIG. 16, the EHT PPDU 1600 may include an L-part 1610 and an EHT-part 1620. The EHT PPDU 1600 may be configured in a format to support backward compatibility. Further, the EHT PPDU 1600 may be transmitted to a single STA and/or multiple STAs. The EHT PPDU 1600 may be an example of an EHT-compliant MU-PPDU.

The EHT PPDU 1600 may be structured such that the L-part 1610 is transmitted first before the EHT-part 1620 for coexistence or backward compatibility with legacy STAs (STAs according to 802.11n/ac/ax specifications). For example, L-part 1610 may include L-STF, L-LTF, and L-SIG. For example, phase rotation may be applied to L-part 1610.

According to one embodiment, EHT part 1620 may include RL-SIG, U-SIG 1621, EHT-SIG 1622, EHT-STF, EHT-LTF, and data fields. Similar to the 11ax specification, an RL-SIG may be included in the EHT part 1620 to extend the reliability and range of the L-SIG. The RL-SIG may be transmitted immediately after the L-SIG and may be configured to repeat the L-SIG.

For example, four extra subcarriers may be applied to the L-SIG and RL-SIG. The extra subcarriers may be configured as [−28, −27, 27, 28]. The extra subcarriers may be modulated in a BPSK fashion. Further, the extra subcarriers may be mapped with coefficients of [−1 −1 −1 1].

For example, an EHT-LTF may be configured as one of 1×EHT-LTF, 2×EHT-LTF, or 4×EHT-LTF. The EHT specification can support EHT-LTFs for 16 spatial streams.

Each of the fields in FIG. 16 may be the same as each of the fields described in FIG. 13.

In the following, the first control signal field (e.g., the U-SIG field) and the second control signal field (e.g., the EHT-SIG field) are specifically described.

Control information that is not included in the first control signal field (e.g., U-SIG field) may be referred to by various names, such as overflowed information or overflow information. The second control signal field (e.g., the EHT-SIG field) may include a common field and a user specific field. Each of the common field and the user specific field may include at least one encoding block (e.g., a binary convolutional code (BCC) encoding block). One encoding block may be transmitted/received via at least one symbol, and one encoding block may not necessarily be transmitted via one symbol. One symbol transmitting an encoding block may have a symbol length of 4 µs.

The transmit/receive PPDUs proposed herein may be used for communications for at least one user. For example, the technical features of this specification may be applied to MU-PPDUs (e.g., EHT MU PPDUs) according to the 11be standard.

Figures 17, 18:
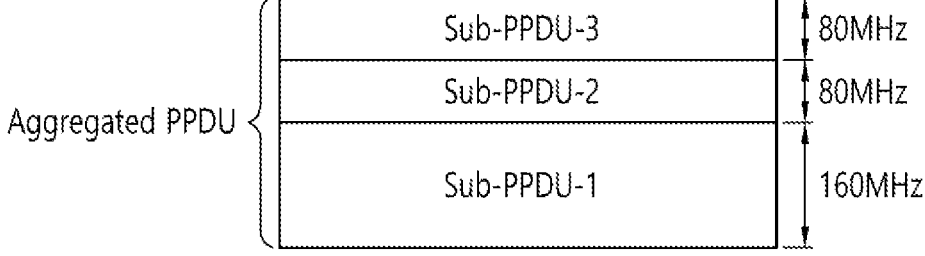
FIG. 17 illustrates an example of a first control signal field or U-SIG field of the present disclosure.
FIG. 18 is a diagram illustrating an Aggregated PPDU of the present disclosure.

FIG. 17 illustrates an example of a first control signal field or U-SIG field of the present disclosure.

As shown, the first control signal field (e.g., the U-SIG field) may include a version independent field 1710 and a version dependent field 1720. For example, the version independent field 1710 may include control information that is consistently included regardless of the version of the wireless LAN (e.g., IEEE 802.11be, and the next generation standard of IEEE 802.11be). For example, the version dependent field 1720 may include control information that is dependent on the version (e.g., IEEE 802.11be specification).

For example, version independent field 1710 may include a 3-bit version identifier indicating 11be and later Wi-Fi versions, a 1-bit DL/UL field BSS color, and/or information related to TXOP duration. For example, version dependent field 1720 may include information related to PPDU format type, and/or Bandwidth, MCS.

For example, the first control signal field (e.g., U-SIG field) shown in FIG. 17 may be jointly encoded by two symbols (e.g., two contiguous 4 µs long symbols). Further, the field of FIG. 17 may be configured based on 52 data tones and 4 pilot tones for each 20 MHz band/channel. Further, the field of FIG. 17 may be modulated in the same manner as HE-SIG-A in the prior art 11ax standard. In other words, the fields of FIG. 17 may be modulated based on a BPSK 1/2 code rate.

For example, the second control signal field (e.g., EHT-SIG field) may be classified into a common field and a user specific field, and may be encoded based on different MCS levels. For example, the common field may include indicative information related to the spatial stream used in the transmit/receive PPDU (e.g., data field) and indicative information related to the RU. For example, the user specific field may include indicative information related to ID information, MCS, coding used by at least one specific user (or receiving STA). Stated differently, the user specific field may include decoding information (e.g., STA ID information, MSC information, and/or channel coding type/rate information) for data fields transmitted via at least one RU as indicated by the RU allocation sub-field included in the common field.

The first control signal field or U-SIG field described above may be transmitted via two contiguous symbols. In other words, the U-SIG field may comprise a first U-SIG signal transmitted via the first symbol and a second U-SIG signal transmitted via the second symbol. Each of the first U-SIG signal and the second U-SIG signal may be configured based on 26 bits of control information.

For example, the first U-SIG signal may be configured based on 26 bits of control information including bits B0 through B25. An example of bits B0 through B25 for the first U-SIG signal is shown below. The fields (or subfields) listed in Table 8 may fall into the category of Version independent.

As described in Table 8, bits B0 to B2 of the first U-SIG signal may include information related to the PHY Version of the PPDU via 3 bits of information. B3 bits to B5 bits of the first U-SIG signal may include information regarding the bandwidth of the transmitted and received PPDUs via 3 bits of information. Bit B6 of the first U-SIG signal may include information regarding whether the transmitted or received PPDU is for UL or DL communication. Bits B7 to B12 of the first U-SIG signal may include information regarding the BSS Color ID of the transmitted or received PPDU. The information regarding the BSS Color ID may be used to identify whether the transmitted or received PPDU is an intra-PPDU or an inter-PPDU. Bits B13 to B19 of the first U-SIG signal may include information regarding the duration of the TXOP of the transmitted or received PPDU. Bits B20 to B24 of the first U-SIG signal may be reserved bits and may be ignored by the receiving STA. Bit B25 of the first U-SIG signal is a reserved bit and may be associated with the termination of the receive operation of the receiving STA.

TABLE 8

| Bit | Field | Number of bits |
|---|---|---|
| B0-B2 | PHY Version Identifier | 3 |
| B3-B5 | Bandwidth | 3 |
| B6 | UL/DL | 1 |
| B7-B12 | BSS Color | 6 |
| B13-B19 | TXOP | 7 |
| B20-B24 | Disregard | 5 |
| B25 | Validate | 1 |

For example, the second U-SIG signal may be configured based on 26 bits of control information including bits B0 through B25. An example of bits B0 through B25 for the second U-SIG signal is shown below. Bits B0 to B 15 of the fields (or subfields) listed in Table 9 may belong to the Version dependent category. Bits B0 to B1 of the second U-SIG signal may contain information regarding whether the transmitted or received PPDU is used for DL OFDMA communication, DL MU-MIMO communication, SU or NDP communication, etc. Bits B2 and B8 of the second U-SIG signal are reserved bits and may relate to the termination of the receive operation of the receiving STA. Bits B3 through B7 of the second U-SIG signal may contain information regarding a puncturing pattern applied to the transmitted and received PPDUs. Bits B9 through B0 of the second U-SIG signal may include information for an MCS technique applied to the EHT-SIG field. Bits B11 to B15 of the second U-SIG signal may include information regarding the number of symbols used to transmit the EHT-SIG field. Bits B16 through B19 of the second U-SIG signal may comprise a CRC field for the U-SIG field. the CRC field may be calculated based on bits B0 to B25 of the first U-SIG signal and bits B0 to B15 of the second U-SIG signal. Bit B25 of the second U-SIG signal may be set to zero as a tail bit.

TABLE 9

| Bit | Field | Number of bits |
|---|---|---|
| B0-B1 | PPDU Type And Compression Mode | 2 |
| B2 | Validate | 1 |
| B3-B7 | Punctured Channel Information | 5 |

TABLE 9-continued

| Bit | Field | Number of bits |
|---|---|---|
| B8 | Validate | 1 |
| B9-B10 | EHT-SIG MCS | 2 |
| B11-B15 | Number Of EHT-SIG Symbols | 5 |
| B16-B19 | CRC | 4 |
| B20-B25 | Tail | 6 |

The second signal field (e.g., the EHT-SIG) may be classified into a common field and a user specific field. For example, the common field may comprise RU allocation information. For example, the user specific field may include at least one user block field user field containing information related to the user (i.e., the receiving STA). The EHT-SIG may be transmitted over an EHT-SIG content channel comprising 20 MHz segments, i.e., one EHT-SIG content channel may be transmitted over a 20 MHz sub-channel. For example, a PPDU with a bandwidth of 80 MHz or more may be transmitted over two EHT-SIG content channels. For example, the two EHT-SIG content channels may be referred to as EHT CC1 and EHT CC2. For example, if a PPDU is transmitted over 160 MHz, an EHT-SIG with different information may be transmitted in each of the two 80 MHz bands. An EHT-SIG transmitted over any one 80 MHz band could be transmitted over EHT CC1 and EHT CC2.

The technical features in this specification pertain to Aggregated PPDUs.

FIG. 18 is a diagram illustrating an aggregated PPDU of the present disclosure. the A-PPDU may be denoted by various designations such as APPDU, transmit APPDU, receive APPDU, etc.

An A-PPDU as described herein may include a plurality of Sub-PPDUs. For example, the A-PPDU may include a first Sub-PPDU (or Sub-PPDU-1). The first Sub-PPDU may be a first type PPDU. the first type PPDU may be referred to by various names, such as a first format PPDU or a first PHY version PPDU. For example, the first type PPDU may be a conventional High Efficiency (HE) PPDU or various types of PPDUs.

For example, the A-PPDU may include a second Sub-PPDU (or Sub-PPDU-2). The second Sub-PPDU may be a second type PPDU. The second type PPDU may be referred to by various names, such as a second format PPDU or a second PHY version PPDU. For example, the second type PPDU may be an extremely high throughput (EHT) PPDU, a high efficiency (HE) PPDU, or various types of PPDUs.

The number of Sub-PPDUs included in the A-PPDU can be varied. For example, an A-PPDU may be created that contains 2, 3, or 4 Sub-PPDUs. Multiple Sub-PPDUs in an A-PPDU can be different types of PPDUs. Alternatively, some of the multiple Sub-PPDUs in an A-PPDU may be of the same type of PPDU. For example, the first and second sub-PPDUs in an A-PPDU may both be EHT PPDUs or HE PPDUs.

The specific figures shown in FIG. 18 are subject to variation. For example, Sub-PPDU-1 may be transmitted over various bands, such as 80 MHz instead of 160 MHz. For example, Sub-PPDU-2 or Sub-PPDU-3 may be transmitted over different bands, such as 160 MHz instead of 80 MHz.

Figure 19:
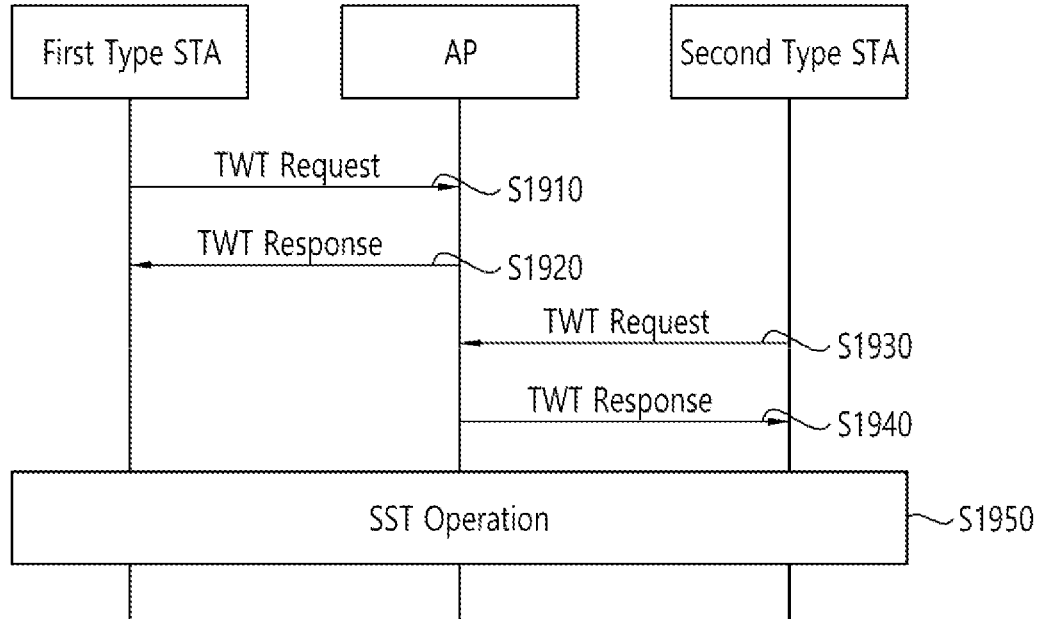
FIG. 19 is a flow chart illustrating an example of the present disclosure.

FIG. 19 is a flow chart illustrating one example of the present disclosure.

The A-PPDU in this specification may be transmitted or received via Subchannel Selective Transmission (SST) operation. The A-PPDU of this specification may be transmitted over the downlink or uplink. For example, the A-PPDU of this specification may be transmitted over the downlink based on SST operation.

Specifically, the A-PPDU of this specification may be transmitted based on a conventional target wake time service period (TWT SP). Conventional WLAN standards may support multiple TWT SPs (e.g., TWT SP1, TWT SP2, . . . . TWT SP #n). Each TWT SP is a time period, and STAs assigned to a particular TWT SP (e.g., non-AP STAs) may remain awake for the duration of the assigned TWT SP. Information related to the start time of a TWT SP can be negotiated via a TWT Request and a TWT Response.

As shown in FIG. 19, a first type STA (e.g., a HE non-AP STA) may request information related to a TWT SP via a TWT Request (S1910). For example, the AP STA may respond with information related to the TWT SP via a TWT Response (S1920). Namely, a TWT SP for the first type STA may be determined through the transmission and reception of the TWT Request/Response, and information related to the channel/band used for transmission and reception during that TWT SP may be determined. As shown in FIG. 19, a second type STA (e.g., an EHT non-AP STA) may request information regarding a TWT SP via a TWT Request (S1930). For example, an AP STA may respond with information related to the TWT SP in a TWT Response (S1940). Through the transmission and reception of the TWT Request/Response, the TWT SP for the second type STA may be determined, i.e., information related to the channel/band used for transmission and reception during that TWT SP may be determined.

For example, a TWT Element may be defined within a TWT Request/Response, and a TWT Channel subfield may be defined within the TWT Element. The TWT Channel subfield may contain (identifying) information related to the channel/band (i.e., TWT channel or TWT sub-channel) used for the SST operation (S1950).

As described above, an A-PPDU of the present disclosure may have various types of Sub-PPDUs, but in the following examples, an example in which the A-PPDU supports a first type STA (e.g., a conventional HE STA) and a second type STA (e.g., an EHT STA) is described.

As shown in FIG. 19, to perform the SST operation S1950, the first type STA (i.e., the HE non-AP STA) and the second type STA (i.e., the EHT non-AP STA) may be assigned a subchannel to transmit and receive PPDU(s) via the SST operation S1950 from the AP, based on conventional individual TWT techniques. For example, the HE non-AP STA may include in the TWT Channel subfield information related to the 80 MHz channel (e.g., Primary 80 MHz channel or Secondary 80 MHz channel) on which to perform the SST operation within the 160 MHz BW. Furthermore, the EHT non-AP STA, like the HE non-AP STA above, may include in the TWT Channel subfield information related to the 80 MHz channel or the 160 MHz channel on which the SST operation is to be performed within the BSS operation BW.

As shown in FIG. 19, individual TWT setting/negotiation operations for A-PPDU associated with the SST operation S1950 may be performed for each HE non-AP STA and each EHT non-AP STA separately. For example, the TWT Channel subfield set in each individual TWT setting/negotiation operation may be configured as a bitmap per 20 MHz. For example, the size of the bitmap used in the HE individual TWT setup/negotiation process or the EHT individual TWT setup/negotiation process when the BSS operation BW is 160 MHz may be 8 bits, and the size of the bitmap used in the EHT individual TWT setup/negotiation process when the BSS operation BW is 320 MHz may be 16 bits.

The SST operation described herein may be performed based on an A-PPDU, wherein the A-PPDU may include a first sub-PPDU (e.g., HE sub-PPDU) for an HE non-AP STA and a second sub-PPDU (e.g., EHT sub-PPDU) for an EHT non-AP STA. Accordingly, appropriate channels/bands are preferably allocated for the HE non-AP STA (i.e., Type 1 STA) and EHT non-AP STA (i.e., Type 2 STA) through individual TWT setup/negotiation processes.

In the following, various examples are described in which appropriate channels/bands (e.g., TWT sub-channels) are established for HE non-AP STAs (i.e., Type 1 STAs) and EHT non-AP STAs (i.e., Type 2 STAs) participating in the SST operation.

For the above SST operation, the HE non-AP STA (i.e., Type 1 STA) may be assigned an 80 MHz subchannel, and the EHT non-AP STA (i.e., Type 2 STA) may be assigned an 80 MHz or 160 MHz subchannel. Considering the subchannels assigned as above, at 160 MHz BW and 320 MHz BW, an A-PPDU for simultaneous transmission to an HE non-AP STA (i.e., type 1 STA) and an EHT non-AP STA (i.e., type 2 STA) may be constructed as follows.

Technical Feature 1. 160 MHz

For example, an example of a BSS operation BW of 160 MHz is described below.

Technical Feature 1.A. Considering the SST operation, 160 MHz can be classified into P80 channels (Primary 80 MHz channels) and S80 channels (Secondary 80 MHz channels). In this case, HE non-AP STAs (i.e., Type 1 STAs) and EHT non AP STAs (i.e., Type 2 STAs) can be allocated as follows.

Technical Feature 1.A.i. For example, the allocation may be as follows. [P80, S80]=[HE non-AP STA, EHT non-AP STA], i.e. the P80 MHz channel may be assigned to an HE non-AP STA and the S80 MHz channel may be assigned to an EHT non-AP STA.

Technical Feature 1.A.ii. For example, it can be assigned as follows. [P80, S80]=[EHT non-AP STA, HE non-AP STA].

Technical Feature 1.B. The 80 MHz to which the HE non-AP STA (i.e., Type 1 STA) is allocated above may also be allocated 20 MHz only HE non-AP STAs.

Technical Feature 1.C. The 80 MHz to which EHT non-AP STA may also be assigned a 20 MHz only EHT non-AP STA.

Technical Feature 2. 320 MHz

For example, an example of a BSS operation BW of 320 MHz is described below.

Technical Feature 2.A. Since the existing HE specifications define a maximum bandwidth (BW) up to 160 MHz, only P160 MHz (Primary 160 MHz) of the total 320 MHz can be allocated for SST operation of HE non-AP STA (i.e., Type 1 STA). In this case, the A-PPDU could be configured as follows.

Technical Feature 2.A.i. In this case, the P160 MHz band may be configured as follows.

Technical Feature 2.A.i.1. For example, of the above P160 MHz band, only P80 MHz may be allocated to HE non-AP STA (i.e., Type 1 STA).

Technical Feature 2.A.i.1.A. For example, it may be assigned as follows. [P80, S80]=[HE non-AP STA, EHT non-AP STA].

Technical Feature 2.A.i.2. For example, of the above P160 MHz band, only S80 MHz may be allocated to HE non-AP STA (i.e., Type 1 STA).

Technical Feature 2.A.i.2.A. For example, it may be assigned as follows. [P80, S80]=[EHT non-AP STA, HE non-AP STA].

Technical Feature 2.A.i.3. For example, each 80 MHz band within the P160 MHz band may be assigned to an HE non-AP STA (i.e., Type 1 STA), i.e., P160 MHz may be assigned only to HE non-AP STA (i.e., Type 1 STA).

Technical Feature 2.A.i.3.A. For example, it may be assigned as follows. [P80, S80]=[HE non-AP STA, HE non-AP STA].

Technical Feature 2.A.i.4. In the above example, S160 (Secondary 160 MHz channel) may be assigned to an EHT non-AP STA (Type 2 STA) via SST.

Technical Feature 2.A.i.5. In the above example, the 80 MHz allocated to HE non-AP STA (i.e., Type 1 STA) may also be allocated to 20 MHz only HE non-AP STA.

Technical Feature 2.A.i.6. In the example above, the 80 MHz allocated to EHT non-AP STA (i.e., Type 2 STA) may also be allocated to 20 MHz only EHT non-AP STA.

Technical Feature 2.B. In contrast to the above, the SST operation allows HE non-AP STA (i.e., Type 1 STA) to be assigned to a single 80 MHz included in the S160 MHz.

Technical Feature 2.B.i. Since the maximum bandwidth (max BW) of the conventional HE standard is 160 MHz, HE non-AP STAs (Type 1 STAs) may not recognize S160. Therefore, the S160 channel included in the 320 MHz band may be indicated by the adjacent 160 MHz following the P160 channel. For example, if the P160 channel has a 160 MHz channel index of one (1), the S160 channel may be indicated with a 160 MHz channel index of two (2), or may be indicated as a new P160 channel. This information (i.e., information about the adjacent 160 MHz) may be transmitted via a beacon frame or may be indicated using center frequency information and frequency offset (or subchannel offset).

Technical Feature 2.B.i.1. The HE non AP STA (i.e., Type 1 STA) can recognize the above S160 channel as a P160 channel.

Technical Feature 2.B.i.1.A. For example, if the BSS operation BW is 320 MHz, there are two 160 MHz channels within that BW, so the HE non-AP STA may be recognized as using each 160 MHz channel based on the 160 MHz channelization. In this case, the existing behavior can be used.

Technical Feature 2.B.ii. As in the P160 channel above, the S160 channel may be allocated for the HE non-AP STA (i.e., Type 1 STA) for SST operation using the following techniques.

Technical Feature 2.B.ii.1. For example, a detailed example for S160 MHz is shown below.

Technical Feature 2.B.ii.1.A. For example, only the first 80 MHz of the S160 MHz band may be allocated to the HE non-AP STA (i.e., Type 1 STA).

Technical Feature 2.B.ii.1.A.i. That is, the allocation may be performed as follows. [First 80, Second80]=[HE non-AP STA, EHT non-AP STA].

Technical Feature 2.B.ii.1.B. For example, in the S160 MHz band, only the Second 80 MHz band may be allocated to the HE non-AP STA (i.e., Type 1 STA).

Technical Feature 2.B.ii.1.B.i. That is, the allocation may be performed as follows. [First 80, Second80]=[EHT non-AP STA, HE non-AP STA].

Technical Feature 2.B.ii.1.C. For example, in the P160 MHz band, the HE non-AP STA may be assigned to each 80 MHz band, i.e., only the HE non-AP STA may be assigned to the P160 MHz.

Technical Feature 2.B.ii.1.C.i. That is, the allocation may be performed as follows. [First 80, Second 80]=[HE non-AP STA, HE non-AP STA].

Technical Feature 2.B.ii.2. In the example described above, the 80 MHz in S160 is classified into first 80 MHz and second 80 MHz for convenience, but in terms of frequency, first 80 MHz may mean upper 80 MHz or lower 80 MHz in S160 MHz.

Technical Feature 2.B.ii.2.A. From a HE STA perspective, S160 can be recognized as another P160 MHz, so that the first 80 MHz and the second 80 MHz can be used as a primary channel and a secondary channel.

Technical Feature 2.B.ii.3. In the example described above, the P160 may be assigned to an HE non-AP STA or an EHT non-AP STA for SST operation.

Technical Feature 2.B.ii.4. The 80 MHz assigned HE non-AP STA above may also be assigned a 20 MHz only HE non-AP STA.

Technical Feature 2.B.ii.5. The 80 MHz to which the EHT non-AP STA is assigned above may also be assigned a 20 MHz only EHT non-AP STA.

Technical Feature 2.C. Considering all of the technical features described above, HE non-AP STAs may be allocated one or more of the 80 MHz channels/bands present in P160 and S160 at 320 MHz through SST operation, and A-PPDUs may be established based on these allocations.

Technical Feature 2.C.i. 80 MHz allocation for A-PPDUs

TABLE 10

| case | 1st 80 MHz | 2nd 80 MHz | 3rd 80 MHz | 4th 80 MHz |
|------|-----------|-----------|-----------|-----------|
| 1 | E | H | E | H |
| 2 | E | H | H | E |
| 3 | H | E | H | E |
| 4 | H | E | E | H |

In the above table, "H" may refer to an HE non AP STA (i.e., Type 1 STA) and "E" may refer to an EHT non AP STA (i.e., Type 2 STA). In the above table, the meanings of '1st', '2nd', '3rd', and '4th' may refer to any 80 MHz within the 320 MHz band. For example, 1st 80 MHz (or 2nd, 3rd, 4th 80 MHz) may refer to various channels/bands, such as P80, S80, Upper 80, Lower 80, etc.

According to the above-described technical feature(s), bands/channels (i.e., TWT sub-channels) for the first type STA and the second type STA may be allocated, and the allocated bands/channels may be used via an SST operation. For example, a transmitting STA (e.g., an AP) may construct an A-PPDU based on the allocated band/channel (i.e., TWT sub-channel) for the first type STA and the second type STA. For example, if the band/channel (i.e., TWT sub-channel) for the Type 1 STA is determined through an individual TWT negotiation step (e.g., steps S1910, S1920 of FIG. 19), then the Type 1 PPDU (e.g., HE-sub-PPDU or HE PPDU portion) included in the A-PPDU may be configured based on the band/channel negotiated in the negotiation step (e.g., steps S1910, S1920 of FIG. 19). For example, based on the band/channel (i.e., TWT sub-channel) for the type 1 STA, the bandwidth and/or preamble puncturing of the type 1 PPDU (e.g., HE-sub-PPDU or HE PPDU portion) may be determined.

Further, if a band/channel (i.e., TWT sub-channel) for the second type STA is determined via an individual TWT negotiation step (e.g., steps S1930, S1940 in FIG. 19), then a second type PPDU (e.g., EHT-sub-PPDU or EHT PPDU portion) included in the A-PPDU may be configured based on the band/channel negotiated in the negotiation step (e.g., steps S1930, S1940). For example, based on the band/channel (i.e., TWT sub-channel) for the type 2 STA, the bandwidth and/or preamble puncturing of the type 2 PPDU (e.g., EHT-sub-PPDU or EHT PPDU portion) may be determined.

With the technical features described above, various forms of A-PPDUs for the 160 MHz or 320 MHz band/channel for SST operation can be constructed. Various examples of the respective BW information included in the first type PPDU (e.g., HE PPDU) and the second type PPDU (e.g., EHT-PPDU) and/or the preamble puncturing techniques applied to the respective sub-PPDUs included in the A-PPDU may be as follows.

Technical Feature 3. The A-PPDU of the present disclosure may preferably have a bandwidth (BW) of 160 MHz or more. However, considering the 20 MHz only STA, the A-PPDU of this specification may be composed of 20 MHz units within an 80 MHz channel/band.

The bandwidth (BW) of a Type 1 PPDU (e.g., HE PPDU) included within an A-PPDU in this specification may be set to 160 MHz. This is because the first type STA (HE non-AP STA) may be allocated to the 80 MHz band/channel for SST operation at 160 MHz.

Technical Feature 4.A. For example, a first type PPDU (e.g., an HE PPDU) included within the A-PPDU of this specification may include a first signal field (e.g., an HE-SIG-A field). The BW subfield of the first signal field (e.g., the HE-SIG-A field) may have a length of 3 bits, and a value of the first signal field (i.e., a value of the BW subfield) may be set for 160 MHz. For example, if preamble puncturing is applied to the first type PPDU (e.g., HE PPDU), the value of the first signal field may be determined based on the preamble puncturing. More specifically, the value of the BW subfield may be determined as follows. For example, the value of the BW subfield may be set to '0' for 20 MHz, set to '1' for 40 MHz, set to '2' for 80 MHz, and set to '3' for 160 MHz or 80+80 MHz. Further, the value of the BW subfield may be set to '4' for a particular first puncturing pattern at 80 MHz, may be set to '5' for a particular second puncturing pattern at 80 MHz, may be set to '6' for a particular third puncturing pattern at 160 MHz or 80+80 MHz, may be set to '7' for a particular fourth puncturing pattern at 160 MHz or 80+80 MHz.

Technical Feature 4.B. For example, a Type 1 PPDU (e.g., an HE PPDU) included within an A-PPDU in this specification may include an HE-SIGB. The RU allocation subfield of the HE-SIGB may include information related to the subchannel or RU assigned to the HE STA (e.g., subchannel/RU indication information).

Technical Feature 5.-PPDUs transmitted and received via SST operation may include a Type 2 PPDU (e.g., EHT PPDU) with the following characteristics.

Technical Feature 5.A. For example, a second type PPDU (e.g., an EHT PPDU) included in the above A-PPDU may include a U-SIG field, and the BW field of the U-SIG field may be configured as follows.

Technical Feature 5.A.i. For example, if the A-PPDU is configured for 160 MHz, the BW subfield of the U-SIG may have a value for 160 MHz.

Technical Feature 5.A.ii. For example, if the A-PPDU is configured for 320 MHz, the BW subfield of the U-SIG may have a value for 320 MHz.

Technical feature 5.A.iii. In summary, the bandwidth of the second type PPDU (e.g., EHT PPDU) included in the A-PPDU may not be set based on the bandwidth occupied by the second type PPDU, but may be set based on the total BW or the entire BW of the A-PPDU. These technical features may give rise to various favorable technical effects. For example, in accordance with one example of the present disclosure, if an A-PPDU is generated in the 320 MHz band and the bandwidth actually occupied by a second type PPDU (e.g., an EHT PPDU) included in the A-PPDU is 160 MHz, the BW subfield of the SIG field (i.e., the U-SIG field) of the second type PPDU may have a value for 320 MHz instead of 160 MHz. In this case, the OBSS STA receiving the A-PPDU may decode the information of the 320 MHz bandwidth indicated by the U-SIG field and recognize that the total bandwidth of the A-PPDU is 320 MHz. This allows the OBSS STA to stop transmitting signals that may interfere with the A-PPDU. For example, if the U-SIG field indicates a bandwidth of 160 MHz, the OBSS STA may not know the full bandwidth of the A-PPDU accurately and may cause interference to some bands of the A-PPDU. The above-described technical features can solve such technical problems.

Technical feature 5.B. The second type PPDU (e.g., EHT PPDU) included in the above A-PPDU may be an EHT MU-PPDU. In this case, bit B6 of the first U-SIG signal shown in Table 8 above (i.e., the UL/DL bit) and bits B0 to B1 of the second U-SIG signal shown in Table 9 above (i.e., the PPDU Type And Compression Mode bit) may have a value for OFDMA transmission. For example, if an A-PPDU is transmitted on the downlink, bit B6 of the first U-SIG signal may have a value of "0" and the two-bit field of the second U-SIG signal (bits B0 and B1) may have a value of "0".

Technical feature 5.B.i. Namely, sub-PPDUs for EHT included in the above A-PPDU may be transmitted via OFDMA technique.

Technical Feature 5.C. As described above, if the sub-PPDU for EHT included in the A-PPDU is transmitted via OFDMA technique, it may have the following characteristics. For example, the U-SIG field of the sub-PPDU for the EHT included in the A-PPDU may be set separately for each 80 MHz segment. For example, if the bandwidth occupied by a second type PPDU (e.g., an EHT PPDU) included in the A-PPDU is 160 MHz, the U-SIG transmitted over the first 80 MHz band of the 160 MHz may include a 5-bit subfield for preamble puncturing information (e.g., a 5-bit subfield configured in bits B3 to B7 of the second SIG signal) applicable to the first 80 MHz band. Further, in this case, the U-SIG transmitted over the second 80 MHz band of the 160 MHz may include a 5-bit subfield (e.g., a 5-bit subfield comprised in bits B3 through B7 of the second SIG signal) for preamble puncturing information applicable to the second 80 MHz band.

Technical Feature 5.C.i. As described above, the 80 MHz puncturing information transmitted over the U-SIG may be configured separately for each 80 MHz.

Technical Feature 5.C.i.1. Of course, if the same puncturing applies to different 80 MHz bands, the same preamble puncturing information may be included in the 5-bit subfield of the above U-SIG.

Technical Feature 5.C.ii. For example, the Type 2 PPDU (e.g., EHT PPDU) included in the A-PPDU may include an EHT-SIG field. The EHT-SIG field may include subchannel and/or puncturing information assigned to the type 2 STA (e.g., EHT non-AP STA).

Technical Feature 6. The above example may be varied. For example, it is possible that the bandwidth of both the HE PPDU and the EHT PPDU included in the A-PPDU is set to 80 MHz considering 20 MHz only STA within 80 MHz.

The above examples are described based on HE non AP STA and EHT non AP STA. However, the examples described herein are not limited thereto. For example, the Technical Feature of this specification may also apply to a new WLAN specification (e.g., an "EHT+" specification) that is proposed after the EHT specification. Accordingly, different channels/bands may be allocated for STAs supporting the new WLAN specification, and A-PPDUs may be constructed that include sub-PPDUs for those STAs.

The technical feature(s) of this specification are subject to various changes. The following describes various operations performed by an STA operating on the basis of this specification.

Figure 20:
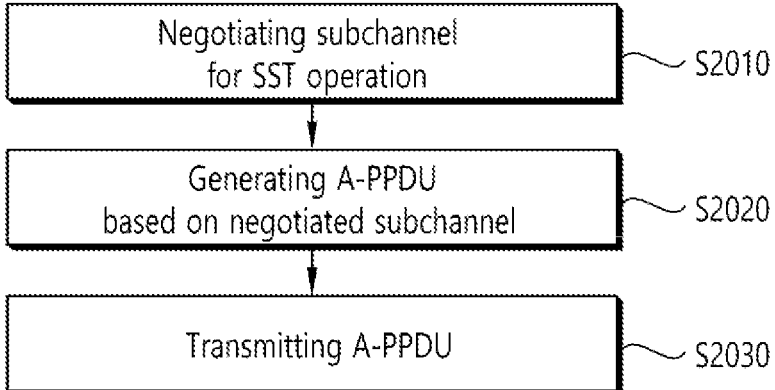
FIG. 20 is a procedural flowchart illustrating operations performed at a transmitting STA.

FIG. 20 is a procedural flow diagram illustrating operations performed at the transmitting STA. The operations in FIG. 20 may be performed at an AP STA.

As in step S2010, the transmitting STA may negotiate a subchannel for the SST operation. For example, the transmitting STA may negotiate subchannels with multiple STAs simultaneously or sequentially. For example, the transmitting STA may negotiate subchannels with a plurality of STAs of different types. For example, the transmitting STA may negotiate a subchannel for SST operation with at least one first type STA (e.g., an HE non-AP STA). For example, steps S1910 and S1920 illustrated in FIG. 19 may be included in step S2010 of FIG. 20. That is, according to the technical feature(s) described above, the transmitting STA may negotiate a sub-channel (e.g., a TWT sub-channel) for SST operation with the at least one first type STA (e.g., an HE non-AP STA). Further, the transmitting STA may negotiate a subchannel for SST operation with at least one second type STA (e.g., EHT non-AP STA).

Although step S2010 of FIG. 20 is shown as a single step, it may include a plurality of sub-steps. For example, step S2010 may include at least one sub-step of performing negotiations with the first type STA, and at least one sub-step of performing negotiations with the second type STA. Further, the step of performing the negotiation may include, for example, a conventional setup/negotiation step for an individual TWT. This may include establishing/negotiating time information regarding a TWT SP in which the first and/or second type STA performs an operation, and establishing/negotiating information regarding a channel or sub-channel (e.g., a TWT sub-channel) for the first and/or second type STA.

As in step S2020, the transmitting STA may generate an A-PPDU. the A-PPDU may be established based on the subchannel negotiated/established via step S2010. A 320 MHz band/channel may be allocated for the A-PPDU, i.e., the A-PPDU may be configured on a 320 MHz channel. Further, the 320 MHz channel may include a primary 160 MHz channel and a secondary 160 MHz channel. A first sub-PPDU (i.e., Type 1 PPDU or HE PPDU as described above) included within the A-PPDU may be configured on the primary 160 MHz channel. A second sub-PPDU (i.e., Type 2 PPDU or an EHT PPDU as described above) included in the A-PPDU may be configured on the secondary 160 MHz channel.

The bandwidth of the channel actually occupied by the first sub-PPDU (or HE PPDU) may be varied, such as 20/40/80/160 MHz. For example, the field (or subfield) regarding the bandwidth of the first signal field (e.g., HE-SIG-A) of the first sub-PPDU (or HE PPDU) may always indicate 160 MHz, regardless of the bandwidth of the channel actually occupied. For example, various channels/bands may be allocated for the first type STA (e.g., HE non-AP STA) via step S2010, and the bandwidth of the channel actually occupied by the first sub-PPDU (or HE PPDU) may be determined based on the channels/bands allocated for the first type STA.

The bandwidth of the channel actually occupied by the second sub-PPDU (or EHT PPDU) may be varied, such as 20/40/80/160 MHz. For example, the field (or subfield) regarding the bandwidth of the second signal field (e.g., U-SIG) of the second sub-PPDU (or EHT PPDU) may always indicate 320 MHz, regardless of the bandwidth of the channel actually occupied. For example, various channels/bands may be allocated for the second type STA (e.g., EHT non-AP STA) via step S2010, and the bandwidth of the channel actually occupied by the second sub-PPDU (or EHT PPDU) may be determined based on the channels/bands allocated for the second type STA.

Additionally or alternatively, the A-PPDU may include type information that distinguishes it from other conventional PPDUs. For example, certain bits of the second sub-PPDU (or EHT PPDU) (e.g., the PPDU Type And Compression Mode bit) may contain information regarding the type of the A-PPDU. For example, the second sub-PPDU may be transmitted based on OFDMA techniques.

Figure 21:
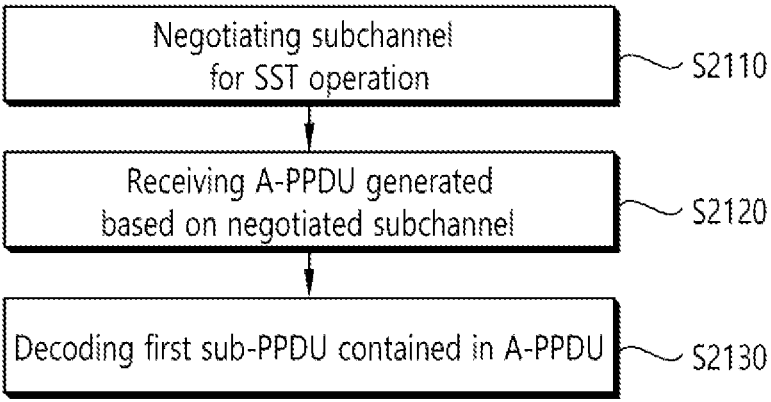
FIG. 21 is a procedural flowchart illustrating operations performed at a receiving STA.

FIG. 21 is a procedural flow diagram illustrating operations performed at a receiving STA. The operations of FIG. 21 may be performed at a first type STA (e.g., an HE non-AP STA).

As in step S2110, the receiving STA may negotiate a subchannel for the SST operation with the transmitting STA. In FIG. 21, the receiving STA (e.g., the HE non-AP STA) may negotiate a sub-channel (e.g., a TWT sub-channel) for the SST operation based on steps S1910 and S1920 of FIG. 19.

Although step S2110 is shown as a single step, it may include a plurality of sub-steps, for example, step S2110 may include conventional setup/negotiation steps for individual TWTs. For example, the receiving STA may use step S2110 to establish/negotiate with the transmitting STA time information regarding the TWT SP on which the first type STA is to perform the operation, and establish/negotiate information regarding a channel or sub-channel (e.g., a TWT sub-channel) for the first type STA.

As in step S2120, the receiving STA may receive an A-PPDU. The A-PPDU may be received based on the subchannel negotiated/established via step S2110. The A-PPDU of step S2120 may be the same as the A-PPDU of step S2020.

As in step S2130, the receiving STA may decode the first sub-PPDU contained in the A-PPDU. For example, if the receiving STA of FIG. 21 is an HE non-AP STA, the receiving STA may decode the HE PPDU contained in the A-PPDU. As described above, the HE-PPDU contained within the A-PPDU may include an HE-SIG-A field, and the HE-SIG-A field may include a BW subfield of 3 bits. Further, the HE-PPDU may include an HE-SIG-B field comprising RU assignment information and the like. the receiving STA may decode the first sub-PPDU (i.e., HE-PPDU) based on the various signal fields (e.g., HE-SIG-A, HE-SIG-B) included in the HE-PPDU.

Figure 22:
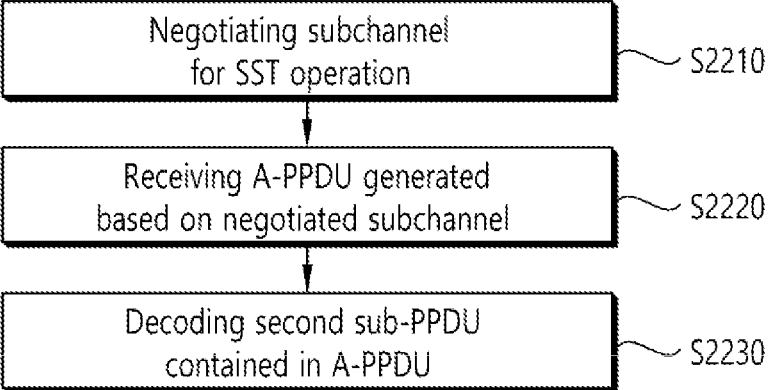
FIG. 22 is another flow chart illustrating operations performed at a receiving STA.

FIG. 22 is a procedural flow diagram illustrating operations performed at a receiving STA. The operations of FIG. 22 may be performed at a second type STA (e.g., an EHT non-AP STA).

As in step S2210, the receiving STA may negotiate a subchannel for SST operation with the transmitting STA. In FIG. 22, the receiving STA (e.g., EHT non-AP STA) may negotiate a sub-channel (e.g., TWT sub-channel) for the SST operation based on steps S1930 and S1940 of FIG. 19.

Although step S2210 is shown as a single step, it may include a plurality of sub-steps, for example, step S2210 may include conventional setup/negotiation steps for individual TWTs. For example, the receiving STA may use step S2210 to establish/negotiate with the transmitting STA time information regarding the TWT SP in which the second type STA performs the operation, and establish/negotiate information regarding a channel or sub-channel (e.g., TWT sub-channel) for the second type STA.

As in step S2220, the receiving STA may receive an A-PPDU. The A-PPDU may be received based on the subchannel negotiated/established via step S2210. The A-PPDU of step S2220 may be the same as the A-PPDU of step S2020.

As in step S2230, the receiving STA may decode the second sub-PPDU contained in the A-PPDU. For example, if the receiving STA of FIG. 22 is an EHT non-AP STA, the receiving STA may decode the EHT PPDU contained in the A-PPDU. As described above, the EHT-PPDU contained within the A-PPDU may include a U-SIG field, and the U-SIG field may include information related to the entire BW of the A-PPDU. Further, the EHT-PPDU may include an EHT-SIG field, which may include RU assignment information and the like. The receiving STA may decode the second sub-PPDU (i.e., EHT-PPDU) based on various signal fields (e.g., U-SIG, EHT-SIG) included in the HE-PPDU.

Each of the operations illustrated in FIGS. 20 through 22 may be performed by the apparatus of FIG. 1 and/or FIG. 14. For example, the transmitting STA of FIG. 20, the receiving STA of FIG. 21, or the receiving STA of FIG. 22 may be implemented by the apparatus of FIG. 1 and/or FIG. 14. The processor of FIG. 1 and/or FIG. 14 may perform each of the operations of FIGS. 20 through 22 described above. Further, the transceiver of FIGS. 1 and/or 14 may perform each of the operations described in FIGS. 20 through 22.

The apparatus proposed herein (e.g., a transmitting STA and a receiving STA) may not necessarily have transceivers and may be implemented in the form of a chip including a processor and memory. The apparatus may generate/store transmit/receive PPDUs according to any of the examples described above. The apparatus may be connected to a separately manufactured transceiver to support actual transmission and reception.

The present disclosure proposes a computer readable medium implemented in various forms. A computer readable medium according to the present disclosure may be encoded with at least one computer program comprising instructions. The instructions stored on the medium may control the processor illustrated in FIG. 1 and/or FIG. 14, that is, the instructions stored on the medium may control the processor presented herein to perform the operations of the transmitting and receiving STA described above (e.g., FIGS. 20 to 22).

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method used in a wireless local area network (WLAN) system, the method comprising:

configuring, by a first access point (AP), an Aggregated Physical Protocol Data Unit (A-PPDU) including a first PPDU based on a first type PPDU and a second PPDU based on a second type PPDU;

transmitting, by the first AP, the A-PPDU to non-access point (non-AP) stations (STAs) included in a first basic service set (BSS) of the first AP, wherein the A-PPDU is configured on a 320 megahertz (MHz) channel, and the 320 MHz channel includes a primary 160 MHz channel and a secondary 160 MHz channel, wherein the first PPDU is configured on the primary 160 MHz channel and the second PPDU is configured on the secondary 160 MHz channel, wherein the first PPDU includes a first signal field including a first field value, and the first field value includes information that a bandwidth of the first PPDU is the primary 160 MHz channel, wherein the second PPDU includes a second signal field including a second field value, and the second field value includes information that a bandwidth of the second PPDU is set to a bandwidth of the A-PPDU being the 320 MHz channel, and wherein, based on an overlapping basic service set (OBSS) non-AP STA included in a second BSS of a second AP overhearing the A-PPDU, reception of a signal from the first AP by the OBSS non-AP STA or transmission of a signal to the first AP by the OBSS non-AP STA in the 320 MHz channel is stopped based on the second field value.

2. The method of claim 1, wherein the first type PPDU is a High Efficiency (HE) PPDU, the second type PPDU is an extremely high throughput (EHT) PPDU, the first signal field is a HE-SIG-A field, and the second signal field is a Universal Signal (U-SIG) field.

3. The method of claim 1, wherein a bandwidth of a subchannel occupied by the first PPDU is 20 MHz, 80 MHZ, or 160 MHz regardless of the first field value.

4. The method of claim 1, wherein a bandwidth of a subchannel occupied by the second PPDU is 20 MHZ, 80 MHZ, or 160 MHz regardless of the second field value.

5. The method of claim 1, wherein the second signal field is transmitted through two contiguous control symbols, wherein the two contiguous control symbols include first and second control symbols, wherein the second control symbol, which is transmitted immediately after the transmission of the first control symbol, is configured based on 26-bit control information, and wherein the 26-bit control information is configured as B0 bit to B25 bit, and the B0 bit and B1 bit are used to indicate the A-PPDU.

6. The method of claim 1, wherein preamble puncturing is applied to the first PPDU, and the first field value is determined based on the preamble puncturing.

7. The method of claim 1, wherein the second PPDU is transmitted based on an orthogonal frequency division multiple access (OFDMA) technique.

8. A first access point (AP) in a wireless local area network (WLAN) system, comprising:

a transceiver transmitting and/or receiving a wireless signal; and a processor controlling the transceiver, wherein the processor is adapted to:

configure an Aggregated Physical Protocol Data Unit (A-PPDU) including a first PPDU based on a first type PPDU and a second PPDU based on a second type PPDU;

transmit the A-PPDU to non-access point (non-AP) stations (STAs) included in a first basic service set (BSS) of the first AP, wherein the A-PPDU is configured on a 320 megahertz (MHz) channel, and the 320 MHz channel includes a primary 160 MHz channel and a secondary 160 MHz channel, wherein the first PPDU is configured on the primary 160 MHz channel and the second PPDU is configured on the secondary 160 MHz channel, wherein the first PPDU includes a first signal field including a first field value, and the first field value includes information that a bandwidth of the first PPDU is the primary 160 MHz channel, wherein the second PPDU includes a second signal field including a second field value, and the second field value includes information that a bandwidth of the second PPDU is set to a bandwidth of the A-PPDU being the 320 MHz channel, and wherein, based on an overlapping basic service set (OBSS) non-AP STA included in a second BSS of a second AP overhearing the A-PPDU, reception of a signal from the first AP by the OBSS non-AP STA or transmission of a signal to the first AP by the OBSS non-AP STA in the 320 MHz channel is stopped based on the second field value.

9. A method used in a wireless local area network (WLAN) system, the method comprising:

receiving, by a non-access point (non-AP) station (STA) included in a first basic service set (BSS) of the first access point (AP), an Aggregated Physical Protocol Data Unit (A-PPDU) including a first PPDU based on a first type PPDU and a second PPDU based on a second type PPDU from a first AP;

decoding, by a non-AP STA, the A-PPDU, wherein the A-PPDU is configured on a 320 megahertz (MHz) channel, and the 320 MHz channel includes a primary 160 MHz channel and a secondary 160 MHz channel, wherein the first PPDU is configured on the primary 160 MHz channel and the second PPDU is configured on the secondary 160 MHz channel, wherein the first PPDU includes a first signal field including a first field value, and the first field value includes information that a bandwidth of the first PPDU is the primary 160 MHz channel, wherein the second PPDU includes a second signal field including a second field value, and the second field value includes information that a bandwidth of the second PPDU is set to a bandwidth of the A-PPDU being the 320 MHz channel, and wherein, based on an overlapping basic service set (OBSS) non-AP STA included in a second BSS of a second AP overhearing the A-PPDU, reception of a signal from the first AP by the OBSS non-AP STA or transmission of a signal to the first AP by the OBSS non-AP STA in the 320 MHz channel is stopped based on the second field value.

\* \* \* \* \*